United States Patent
Agulnek et al.

(10) Patent No.: US 12,384,403 B1
(45) Date of Patent: Aug. 12, 2025

(54) SYSTEMS AND METHODS FOR INTELLIGENT VEHICLE- SPECIFIC DIGITAL ALERTING

(71) Applicant: HAAS, Inc., Chicago, IL (US)

(72) Inventors: Jeremy Agulnek, Chicago, IL (US); Jigar Patel, Arlington Heights, IL (US); Cory Hohs, Chicago, IL (US)

(73) Assignee: HAAS, Inc., Chicago, IL (US)

( * ) Notice: Subject to any disclaimer, the term of this patent is extended or adjusted under 35 U.S.C. 154(b) by 0 days.

(21) Appl. No.: 18/945,118

(22) Filed: Nov. 12, 2024

(51) Int. Cl.
*B60W 50/14* (2020.01)
*G08G 1/0967* (2006.01)

(52) U.S. Cl.
CPC ........... *B60W 50/14* (2013.01); *G08G 1/0967* (2013.01)

(58) Field of Classification Search
CPC .............................. B60W 50/14; G08G 1/0967
See application file for complete search history.

(56) References Cited

U.S. PATENT DOCUMENTS

| | | | |
|---|---|---|---|
| 8,612,131 B2 | 12/2013 | Gutierrez et al. | |
| 9,494,439 B1* | 11/2016 | Ross | G05D 1/0022 |
| 9,659,496 B2 | 5/2017 | Massey et al. | |
| 10,008,111 B1 | 6/2018 | Grant | |
| 10,282,996 B1* | 5/2019 | Buchbut | G08G 1/164 |
| 12,033,506 B1 | 7/2024 | Deyaf et al. | |
| 12,063,572 B2* | 8/2024 | Patel | H04W 4/029 |
| 12,293,660 B2* | 5/2025 | Patel | G08G 1/0967 |
| 2007/0159354 A1 | 7/2007 | Rosenberg | |
| 2008/0074286 A1 | 3/2008 | Gill et al. | |
| 2009/0174572 A1 | 7/2009 | Smith | |
| 2012/0313792 A1 | 12/2012 | Behm et al. | |
| 2013/0069773 A1* | 3/2013 | Li | B60W 30/0956 340/436 |
| 2014/0279707 A1 | 9/2014 | Joshua et al. | |
| 2015/0254978 A1 | 9/2015 | Mawbey et al. | |
| 2016/0210858 A1 | 7/2016 | Foster et al. | |
| 2018/0050698 A1* | 2/2018 | Polisson | G05D 1/0061 |
| 2018/0268690 A1 | 9/2018 | Gebers | |

(Continued)

OTHER PUBLICATIONS

Bokare, P.S. et al., "Acceleration-Deceleration Behaviour of Various Vehicle Types", World Conference on Transport Research; Transportation Research Procedia; vol. 25; Jun. 2017; pp. 4733-4749; https://www.sciencedirect.com/science/article/pii/S2352146517307937; 17 pages.

(Continued)

*Primary Examiner* — Thomas D Alunkal
(74) *Attorney, Agent, or Firm* — LOZA & LOZA, LLP

(57) ABSTRACT

Methods and systems for use in cloud-based digital vehicle alerting are disclosed. In an example, a computer-implemented method for alerting vehicles involves receiving, at a cloud computing system, digital data that includes location information about a vehicle, determining, by the cloud computing system, when to output a digital alert about a roadway hazard from the safety cloud, which is specific to the vehicle, based on a location of the roadway hazard, the location information about the vehicle, and a factor that is known by the cloud computing system and that affects the ability of the vehicle to take a precautionary action, and outputting, from the cloud computing system, the vehicle-specific digital alert according to the determination.

18 Claims, 13 Drawing Sheets

(56) References Cited

U.S. PATENT DOCUMENTS

| | | | |
|---|---|---|---|
| 2020/0019187 A1* | 1/2020 | Wu | G08G 1/096725 |
| 2020/0074853 A1 | 3/2020 | Miller et al. | |
| 2021/0025730 A1* | 1/2021 | White, III | G07C 5/008 |
| 2022/0397402 A1* | 12/2022 | Bolless | G01C 21/3841 |
| 2023/0124536 A1 | 4/2023 | Chien et al. | |
| 2024/0067087 A1 | 2/2024 | Tucker et al. | |

OTHER PUBLICATIONS

Min, Kyunghan et al., "Vehicle Deceleration Prediction Model to Reflect Individual Driver Characteristics by Online Parameter Learning for Autonomous Regenerative Braking of Electric Vehicles", Italian National Conference on Sensors; Sep. 26, 2019; https://www.mdpi.com/1424-8220/19/19/4171; 24 pages.

Santini, Stefania et al., "On-Board Road Friction Estimation Technique for Autonomous Driving Vehicle-Following Maneuvers", Applied Sciences; vol. 11, Issue 5; https://www.mdpi.com/2076-3417/11/5/2197March 2021; 27 pages.

\* cited by examiner

*330*

| Vehicle ID | Location Information | Supplemental Information |
|---|---|---|
| *332* | *334* | *336* |

| Vehicle ID | Location Information | Supplemental Information | Alert ID |
|---|---|---|---|
| *342* | *344* | *346* | *348* |

FIG. 3C

| Speed (mph) | Alert buffer time (seconds) | Desired separation distance (feet) |
|---|---|---|
| 25 | 15 - 20 | 550 - 733 |
| 55 | 15 - 20 | 1,200 - 1,600 |
| 75 | 15 - 20 | 1650 - 2200 |
| 60 | 20 | 1760 |
| 60 - 80 | 20 | 1760 - 2347 |
| 60 | 15 - 20 | 1320 - 1760 |
| 60 - 80 | 15 - 20 | 1320 - 2347 |

FIG. 7

| Baseline rating | Adjustment |
|---|---|
| baseline | n/a |
| baseline+ | add 20% |
| baseline++ | add 40% |
| baseline+++ | add 60% |
| baseline++++ | add 80% |
| baseline+++++ | add 100% |

| Factor | Baseline rating |
|---|---|
| Passenger vehicle | Baseline |
| Semi-trailer truck | Baseline+++ |
| Multi-passenger bus | Baseline++ |
| Windshield wipers on | Baseline+ |
| Headlight on | Baseline+ |
| Fog lights on | Baseline+++ |
| Road friction measurement (on-vehicle sensor): optimal | Baseline |
| Road friction measurement (on-vehicle sensor): suboptimal | Baseline++ |
| Nearby traffic (on-vehicle sensor): light | Baseline |
| Nearby traffic (on-vehicle sensor): heavy | Baseline+ |
| driver age: 30-60 | Baseline |
| driver age: <30, >60 | Baseline++ |
| Ambient temperature: >32 F | Baseline |
| Ambient temperature: <32 F | Baseline++ |
| Ambient temperature: <10 F | Baseline++++ |
| Curved road | Baseline+ |
| Known blind spot | Baseline++ |
| Icy road | Baseline++++ |
| Light rain | Baseline+ |
| Heavy rain | Baseline+++ |
| Daytime - high visibility | Baseline |
| Nightime - low visibility | Baseline+ |
| Nearby traffic (3rd party source): light | Baseline |
| Nearby traffic (3rd party source): heavy | Baseline+ |
| Vehicle weight: <2000 pounds | Baseline |
| Vehicle weight: >2000 pounds | Baseline+ |

FIG. 9

SYSTEMS AND METHODS FOR INTELLIGENT VEHICLE- SPECIFIC DIGITAL ALERTING

BACKGROUND

Digital alerting is being used to improve roadway safety. Cloud based safety systems are being used to track in real time the overlap of alerting zones and vehicles that may benefit from an alerting of a possible roadway hazard. Digital alerting involves delivering a digital alert to a vehicle that may encounter a roadway hazard so that the vehicle can take a precautionary action to avoid the roadway hazard. For example, precautionary actions to avoid a roadway hazard may involve a vehicle slowing down, changing lanes, or moving over in response to a received digital alert. Ideally, a digital alert of a roadway hazard is provided to a nearby vehicle enough in advance of encountering the roadway hazard that the vehicle can safely take such a precautionary action.

SUMMARY

Methods and systems for use in cloud-based digital vehicle alerting are disclosed. In an example, a computer-implemented method for alerting vehicles involves receiving, at a cloud computing system, digital data that includes location information about a vehicle, determining, by the cloud computing system, when to output a digital alert about a roadway hazard from the safety cloud, which is specific to the vehicle, based on a location of the roadway hazard, the location information about the vehicle, and a factor that is known by the cloud computing system and that affects the ability of the vehicle to take a precautionary action, and outputting, from the cloud computing system, the vehicle-specific digital alert according to the determination.

In an example, the factor that affects the ability of the vehicle to take a precautionary action is obtained from the digital data that includes location information about the vehicle, which was received at the cloud computing system.

In an example, the factor that affects the ability of the vehicle to take a precautionary action is obtained in response to the location information about the vehicle and from weather information obtained from another source.

In an example, the factor that affects the ability of the vehicle to take a precautionary action is obtained in response to the location information about the vehicle and from digital data obtained from another source.

In an example, the factor that affects the ability of the vehicle to take a precautionary action is obtained in response to the location information about the vehicle and in response to weather conditions obtained from a third party source.

In an example, the factor that affects the ability of the vehicle to take a precautionary action is a current weight of the vehicle and wherein the vehicle-specific digital alert is output to account for the current weight of the vehicle.

In an example, the factor that affects the ability of the vehicle to take a precautionary action is a current weight of the vehicle that is included in the digital data and wherein the vehicle-specific digital alert is output to account for the current weight of the vehicle.

In an example, the digital data includes an indication that the vehicle's windshield wipers are on, the factor that affects the ability of the vehicle to take a precautionary action is the indication that the vehicle's windshield wipers are on, and the vehicle-specific digital alert is output to account for the vehicle's wipers being on.

In an example, the digital data includes an indication that the vehicle's lights are on, the factor that affects the ability of the vehicle to take a precautionary action is the indication that the vehicles headlights are on, and the vehicle-specific digital alert is output to account for the vehicle's lights being on.

In an example, the factor that affects the ability of the vehicle to take a precautionary action is an indication of road friction corresponding to the vehicle and wherein the vehicle-specific digital alert is output to account for the indication of road friction.

In an example, the digital data includes an indication of a type of the vehicle, the factor that affects the ability of the vehicle to take a precautionary action is the type of the vehicle, and the vehicle-specific digital alert is output to account for the type of the vehicle.

In an example, the digital data includes an indication that the vehicle is a truck, the factor that affects the ability of the vehicle to take a precautionary action is that the vehicle is a truck, and the vehicle-specific digital alert is output to account for the vehicle being a truck.

In an example, the factor is visibility that is determined in response to the location of the vehicle and a timestamp associated with the digital data.

In an example, the factor is a weather condition that is determined in response to the location of the vehicle.

In an example, determining when to output the vehicle-specific digital alert from the cloud computing system involves adjusting a baseline separation distance.

In an example, determining when to output the vehicle-specific digital alert from the cloud computing system involves adjusting a baseline separation distance by a safety margin.

In an example, modifying the digital alerting rule includes changing a characteristic of how a digital alert is presented within a vehicle.

In an example, the method further involves 1) receiving telemetry data at the cloud computing system that includes a location of a roadway hazard, 2) receiving telemetry data at the cloud computing system that includes locations and vehicle identifiers corresponding to a plurality of vehicles, and 3) generating vehicle-specific digital alerts for vehicles that are in an alerting zone of the roadway hazard in response to the location of the roadway hazard and the locations of the plurality of vehicles.

In another example, a non-transitory computer readable medium that includes instructions to be executed in a computer system is disclosed. The instructions, when executed in the computer system, perform a method involving receiving, at a cloud computing system, digital data that includes location information about a vehicle, determining, by the cloud computing system, when to output a digital alert about a roadway hazard from the safety cloud, which is specific to the vehicle, based on a location of the roadway hazard, the location information about the vehicle, and a factor that is known by the cloud computing system and that affects the ability of the vehicle to take a precautionary action, and outputting, from the cloud computing system, the vehicle-specific digital alert according to the determination.

In another example, a computer-implemented method for alerting vehicles involves receiving, at a cloud computing system, digital data that includes location information about a vehicle, and outputting, from the cloud computing system, a vehicle-specific digital alert corresponding to a roadway hazard, wherein the vehicle-specific digital alert is output from the cloud computing system based on a location of the roadway hazard, the location information about the vehicle, and a factor other than speed that is known by the cloud computing system and that affects the ability of the vehicle to take a precautionary action.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 3B is an example of a vehicle data message that is used to communicate vehicle telemetry data from a vehicle to the vehicle tracking system and/or to a safety cloud.

FIG. 3C is an example of an alerting vehicle data message that is used to communicate alerting vehicle telemetry data from an alerting vehicle to the alert tracking system and/or to the safety cloud.

FIG. 7 is a table of example baseline distances that are calculated for different speeds, speed ranges, alert buffer times, and alert buffer time ranges.

FIG. 8 is a table that includes example baseline ratings and corresponding adjustments that are made to, for example, a baseline separation distance.

FIG. 9 is a table of examples of factors and corresponding baseline ratings that can be used by the safety cloud to determine when to output vehicle-specific digital alerts.

Throughout the description, similar reference numbers may be used to identify similar elements.

DETAILED DESCRIPTION

Figure 1:
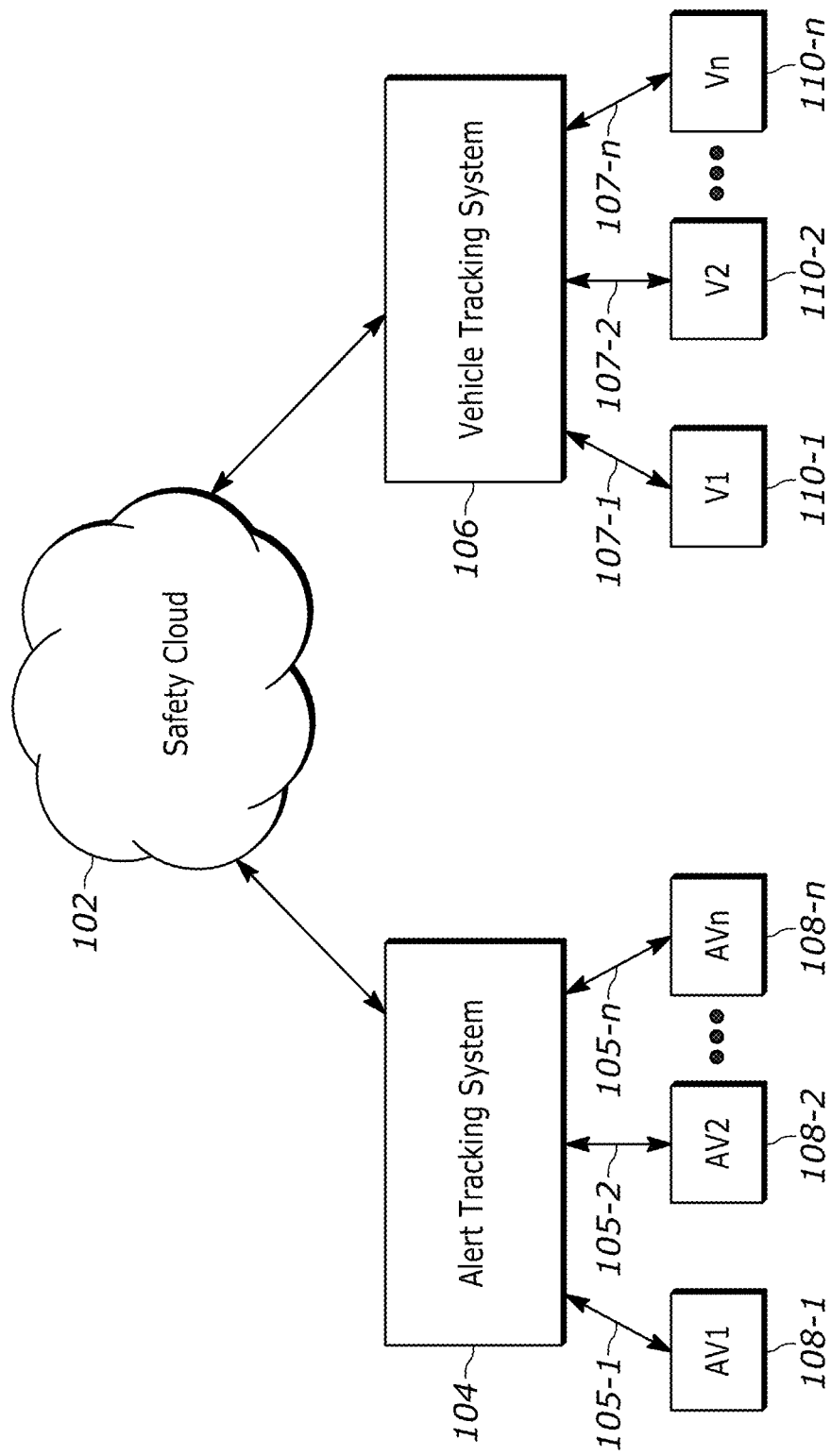
FIG. 1 is a high-level overview of a safety system for vehicle alerting.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

An "alerting zone" may be characterized as a geographical area near an alerting vehicle, near a route of the alerting vehicle, near a roadway hazard (e.g., a construction zone, a car accident, a vehicle stopped along the side of the road, a lane closure, a road closure, debris/obstacle on a road, etc.), or any combination thereof. Examples of an alerting zone may include, but are not limited to, a geographical area that covers a projected path of an alerting vehicle (plus X miles along each side of the path), a geographical area that surrounds an alerting vehicle (by X miles or X feet) and that changes as the alerting vehicle changes locations (e.g., travels along a projected path), or a geographical area that is within an X (X represents a positive value) mile or feet radius of a roadway hazard. In some examples, the geographical area of an alerting zone is defined by a set of geographical coordinates that are within a predetermined range of a particular location. In some embodiments, the geographical area may resemble a circle, an oval, a rectangle, a line, or other shape. In some other embodiments, the geographical area may be identified by portions or segments of a road or roads that are near the hazard. In an embodiment, an alerting zone is determined by/in a safety cloud of a safety system. An example of a safety system is described in further detail with reference to FIG. 1.

FIG. 1 is a high-level overview of a safety system 100. The safety system 100 includes a safety cloud 102 that is connected to an alert tracking system 104 and to a vehicle tracking system 106. The safety cloud 102 may be implemented via software running on a computing system such as a remote server, a cloud computing system such as a public cloud (e.g., AMAZON® Web Services (AWS), GOOGLE® Cloud, MICROSOFT® Azure, etc.), and/or a private cloud. In an embodiment, the safety cloud is implemented via a cloud computing system. The alert tracking system 104 and/or the vehicle tracking system 106 may be implemented via third-party computing systems, including for example, software running on a computing system such as a remote server, a public cloud, and/or a private cloud.

The alert tracking system 104 connects to one or more alerting vehicles (AVs), implemented as alerting vehicles AV1 108-1, AV2 108-2, and AVn 108-$n$ (where n represents an integer of one or more), via, for example, a wireless service provider network (e.g., 3G, 4G, 5G, etc.). Alerting vehicles AV1 108-1, AV2 108-2, and AVn 108-$n$ connect to the alert tracking system 104 over wireless connections via a first connection 105-1, a second connection 105-2, and an nth connection 105-$n$, respectively. Examples of the alerting vehicles include emergency vehicles (e.g., a police car, an ambulance, a firetruck, a military vehicle, or the like), safety vehicles (e.g., a construction vehicle, a towing vehicle, or the like), and/or other vehicles/devices that are capable of sending alerting vehicle data and/or connecting to the alert tracking system 104 over a wireless connection via a wireless service provider network. The alerting vehicles AVs 108-1, 108-2, and 108-$n$ may be included in an emergency vehicle fleet (e.g., a fleet of police cars corresponding to a police department, a fleet of firetrucks corresponding to a fire department, etc.). In an embodiment, the AVs 108-1, 108-2, and 108-$n$ are equipped with radios (e.g., a fixed radio and/or a mobile radio) to implement a wireless connection with a wireless service provider network. Although an alerting vehicle may commonly be a vehicle, the alerting vehicle may alternatively be an object with a radio that is capable of sending telemetry data and/or of connecting to the alert tracking system 104.

In an embodiment, alerting vehicles AV1 108-1, AV2 108-2, and AVn 108-$n$ transmit alerting vehicle telemetry data to the alert tracking system 104. As an example, the alerting vehicle telemetry data may include a vehicle ID that corresponds to and uniquely identifies the vehicle (e.g., AV1 308-1, AV2 308-2, or AVn 308-$n$), location information (e.g., longitude and latitude coordinates) that corresponds to the location of the vehicle, a speed, acceleration, trajectory, direction, and/or azimuth of the vehicle, and an alert ID that indicates whether emergency lights of an alerting vehicle are on/off. In an example, the alerting vehicles transmit alerting vehicle telemetry data to the alert tracking system on regular intervals, such as 2 second intervals. In some examples, the interval may be different depending on the state of the alerting vehicle, for example, in a range of 1-20 second intervals. For example, an alerting vehicle may transmit vehicle telemetry data at shorter time intervals while the vehicle is in an alerting state (e.g., while its emergency lights are on).

The vehicle tracking system 106 connects to one or more vehicles (V), implemented as vehicles V1 110-1, V2 110-2, and Vn 110-$n$ (n represents an integer greater than one), via a wireless service provider wireless network. Vehicles V1 110-1, V2 110-2, and Vn 110-$n$ connect to the vehicle tracking system over wireless connections via a first connection 107-1, a second connection 107-2, and an nth connection 107-$n$, respectively. As described herein, a "vehicle" may refer to a civilian vehicle, a consumer vehicle, a passenger vehicle, or more generally to a vehicle that is not configured as an alerting vehicle. For example, the vehicles V1 110-1, V2 110-2, and Vn 110-$n$ may be considered as "non-alerting" vehicles because the vehicles are not connected to the alert tracking system 104, the vehicles do not have emergency lights or a siren, and/or the vehicles are not configured to transmit an alert signal or notification that explicitly indicates, for example, whether or not emergency lights and/or siren are on. The vehicles V1 110-1, V2 110-2, and Vn 110-$n$ may be included in a vehicle fleet (e.g., a fleet of cars owned by a company). In an embodiment, the vehicles V1 110-1, V2 110-2, and Vn 110-$n$ are equipped with radios (e.g., a fixed radio and/or a mobile radio) to implement a wireless connection to a wireless service provider network. In an embodiment, vehicles V1 110-1, V2 110-2, and Vn 110-$n$ periodically send vehicle telemetry data to the vehicle tracking system 106 via the wireless service provider network. In an example, the vehicles transmit vehicle telemetry data to the vehicle tracking system on regular intervals, such as 2 second intervals. In some examples, the interval may be different depending on different factors, for example in a range of 1-20 second intervals. For example, a vehicle may transmit vehicle telemetry data at shorter time intervals while the vehicle is in an alerting zone. In an example, the vehicle telemetry data may include a vehicle ID that corresponds to and uniquely identifies the vehicle (e.g., V1 110-1, V2 110-2, or Vn 110-$n$), location information (e.g., longitude and latitude coordinates) that corresponds to the location of the vehicle, a speed, acceleration, trajectory, direction, and/or azimuth of the vehicle although the vehicle telemetry data may include other types of information. Although vehicles V1 110-1, V2 110-2, and Vn 110-$n$ may commonly be vehicles, the vehicles V1, V2, and/or Vn may also be an object such as a radio, a smartphone, or other similar device capable of sending telemetry data and/or of connecting to the vehicle tracking system 106.

In some embodiments, the safety cloud 102 receives alerting vehicle telemetry data from alerting vehicles AV1 108-1, AV2 108-2, and/or AVn 108-$n$ via the alert tracking system 104, and receives vehicle telemetry data from vehicles V1 110-1, V2 110-2, and/or Vn 110-$n$ via the vehicle tracking system 106. The safety cloud 102 may use the alerting vehicle telemetry data to determine an alerting zone that is associated with an alerting vehicle. The safety cloud 102 may use the vehicle telemetry data to determine whether any non-alerting vehicles are located in the alerting zone, and to determine whether or not to provide a digital alert to vehicles that are located in the alert zone, where the digital alert may indicate that there is a roadway hazard nearby.

Cloud based safety systems, similar to the system described with reference to FIG. 1, may establish an alerting zone relative to an alerting vehicle or other roadway hazard and then send digital alerts to non-alerting vehicles that are located within the alerting zone. A conventional way of establishing an alerting zone involves identifying a geographical area that covers a projected path of an alerting vehicle and/or a geographical area that surrounds the alerting vehicle or that surrounds some roadway hazard.

Examples of how a cloud-based safety system can be used to alert vehicles of potential roadway hazards is described with reference to FIGS. 2A, 2B, and 3A-3E.

Figure 2A:
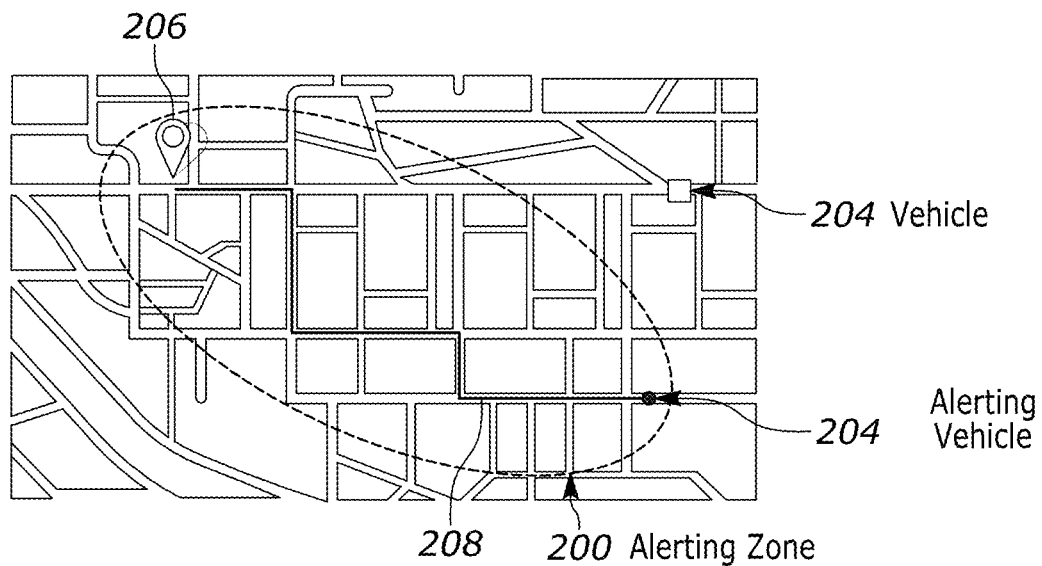
FIG. 2A depicts an example of a vehicle located outside an alerting zone.

FIG. 2A depicts an example of a vehicle 202 that is located outside of an alerting zone 200. In the example illustrated by FIG. 2A, the alerting zone 200 is a geographical area that surrounds an alerting vehicle 204, or some other roadway hazard. In the example, the alerting zone 200 is established by the safety cloud in response to receiving an indication that an alerting vehicle has its warning lights on and includes a geographical area around a destination 206 of the alerting vehicle 204 and a projected path 208 of the alerting vehicle to the destination. The destination 206 may be, for example, an emergency site (e.g., a car accident, a structure fire, a crime site, or the like), a safety hazard (e.g., a weather hazard, a road closure, a lane closure, a road obstruction, or the like), or other similar roadway hazard. Because the vehicle 202 is located outside of the alerting zone 200, the safety cloud determines that the vehicle does not need to be alerted about the presence of the alerting vehicle 204. Thus, no alerting message is sent to the vehicle 202.

Figure 2B:
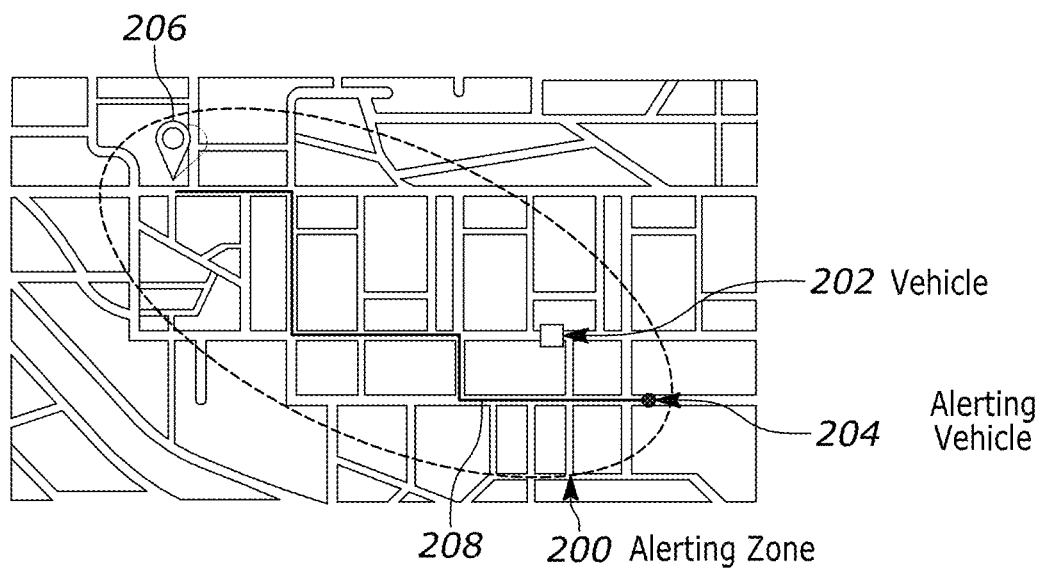
FIG. 2B depicts an example of a vehicle located in an alerting zone.

FIG. 2B depicts an example of the vehicle 202 being located in the alerting zone 200. In the example shown illustrated in FIG. 2B, the alerting zone 200 includes the alerting vehicle 204, the projected path 208 of the alerting vehicle, and the destination 206 of the alerting vehicle as described with reference to FIG. 2A. In contrast to FIG. 2A, the vehicle 202 shown in FIG. 2B is located in the alerting zone 200. Because the vehicle 202 is located in the alerting zone 200, the safety cloud determines that the vehicle needs to be alerted about the presence of the alerting vehicle 204. Thus, an alerting message (also referred to as a digital alert) is sent to the vehicle 202. In some examples, the safety cloud is configured to notify vehicles that are nearby a roadway hazard (which may include a moving roadway hazard such as a moving police car, or a stationary roadway hazard such as a disabled vehicle on the shoulder of a freeway) by providing digital alerts to the nearby vehicles. In an example, nearby vehicles are vehicles that are located within an alerting zone. In other examples, nearby vehicles are vehicles that are projected to encounter the roadway hazard, whether the roadway hazard is moving or stationary. Vehicles that move into an active alerting zone may also be considered to be nearby the roadway hazard and thus receive a digital alert.

An example that illustrates the flow of data within a safety system, which is similar to the safety system 100 described with reference to FIG. 1, is described herein with reference to FIG. 3A-3E.

Figure 3A:
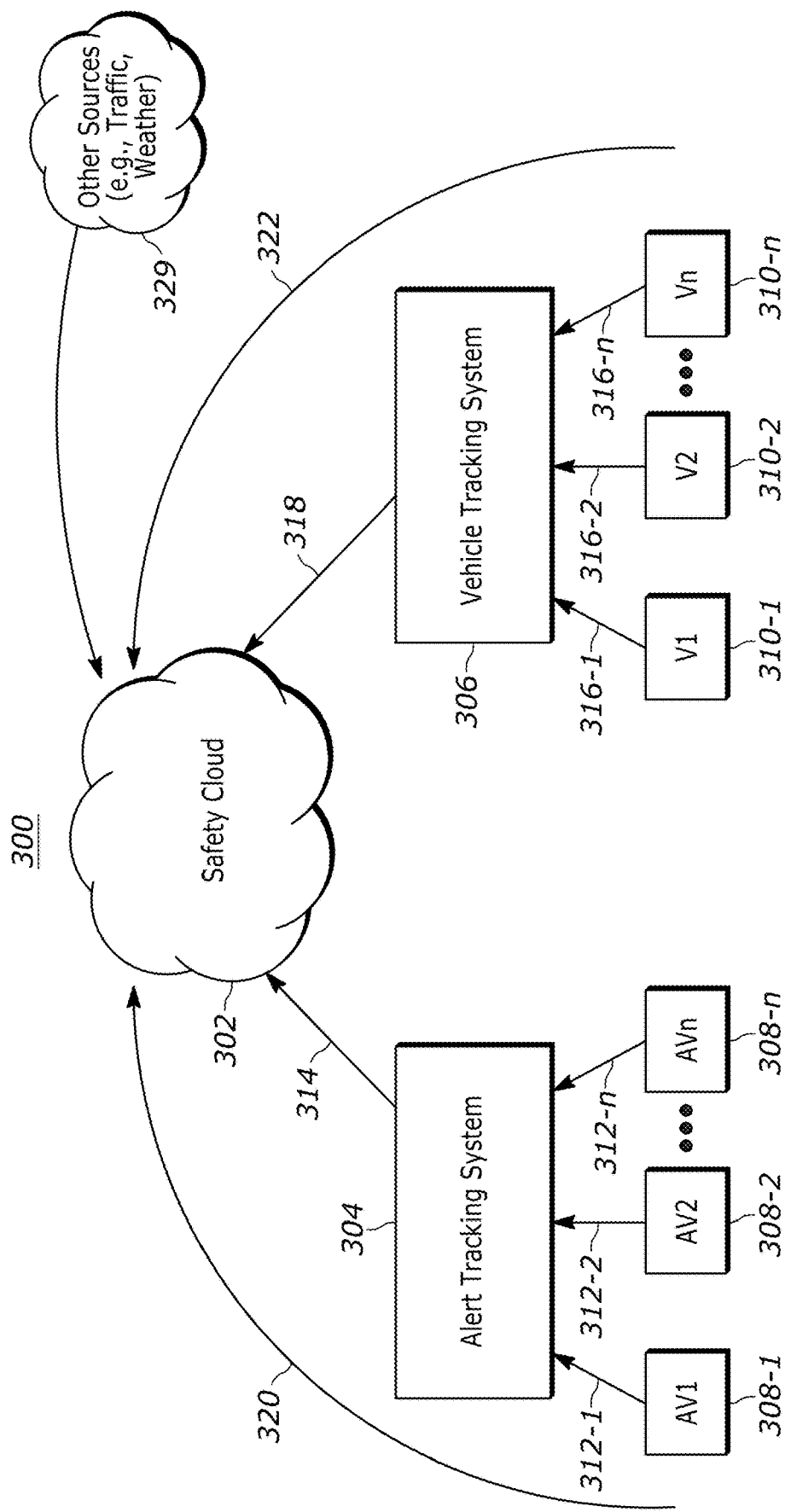
FIG. 3A illustrates the flow of data to a safety cloud.

FIG. 3A illustrates an example of the flow of data to a safety cloud. The flow of data to the safety cloud may represent a process for collecting data (e.g., from alerting vehicles and from non-alerting vehicles). In particular, the example of FIG. 3A illustrates a safety system 300 that includes a safety cloud 302, an alert tracking system 304 that communicates with alerting vehicles AV1 308-1, AV2 308-2, and/or AVn 308-n, and a vehicle tracking system 306 that communicates with vehicles V1 310-1, V2 310-2, and/or Vn 310-n as described with reference to FIG. 1. The example of FIG. 3A illustrates the flow of data to the safety cloud 302. In an embodiment, alerting vehicles AV1 308-1, AV2 308-2, and/or AVn 308-n share alerting vehicle telemetry data with the alert tracking system 304 via wireless connections (represented by arrows 312-1, 312-2, and 312-n). In an example, the alerting vehicle telemetry data may include a vehicle ID, location information at a particular time (e.g., a timestamp and latitude and longitude coordinates), speed, acceleration, trajectory, direction, and/or azimuth, and an alert ID that corresponds to an alerting status/mode of an alerting vehicle, e.g., lights on/off. The alert tracking system 304 shares the alerting vehicle telemetry data with the safety cloud 302 (represented by arrow 314). In an embodiment, vehicles V1 310-1, V2 310-2, and/or Vn 310-n share vehicle telemetry data with the vehicle tracking system 306 at regular intervals (e.g., every 2 seconds) via wireless connections (represented by arrows 316-1, 316-2, and 316-n). In an example, the vehicle telemetry data may include a vehicle ID, location information (e.g., timestamp and latitude and longitude coordinates), speed, acceleration, trajectory, direction, and/or azimuth. The vehicle tracking system 306 shares the vehicle telemetry data with the safety cloud 302 (represented by arrow 318).

In some embodiments, alerting vehicles AV1 308-1, AV2 308-2, and/or AVn 308-n share alerting vehicle telemetry data directly with the safety cloud 302 (represented by arrow 320), and/or vehicle V1 310-1, V2 310-2, and/or Vn 310-n share vehicle telemetry data directly with the safety cloud 302 (represented by arrow 322). In such an embodiment, alerting vehicles AV1 308-1, AV2 308-2, and/or AVn 308-n share alerting vehicle telemetry data directly with the safety cloud 302 by bypassing the alert tracking system 304, and vehicles V1 310-1, V2 310-2, and/or Vn 310-n share vehicle telemetry data directly with the safety cloud 302 by bypassing the vehicle tracking system 306.

Although the alert tracking system 304 is described as sharing alerting vehicle telemetry data from alerting vehicles AV1 308-1, AV2 308-2, and/or AVn 308-n, the alert tracking system may also share vehicle telemetry data from other vehicles or devices (e.g., a roadside vehicle, a roadside sensor, a maintenance vehicle, a construction site device, drawbridge warning lights, railroad crossing gate/lights etc.). Additionally, the alerting vehicle telemetry data may correspond to other alert-related data such as, for example, a weather hazard, a lane closure, a road obstruction, a construction site, traffic, etc. In some embodiments, other parties may have access to the alert tracking system 304, such that the other parties (e.g., construction teams, utility teams, weather tracking teams, etc.) may tap into the alert tracking system and input/send alert-related data to the safety cloud 302 to indicate a safety hazard and/or an alerting zone. In such an embodiment, the other parties may input alert-related data that includes a specific location (e.g., an address or longitude and latitude coordinates) and/or a zone and an alert status (e.g., construction active, drawbridge up, railroad crossing gate down) to indicate the safety hazard and/or the alerting zone. Additionally, other sources 329 may provide information in the form of digital data to the safety cloud. For example, other sources of digital data may include third-party sources such as commercial mapping entities (WAZE®, GOOGLE® Maps, APPLE® Maps), weather entities (e.g., government or private sources of weather information), vehicle manufacturers that maintain a vehicle tracking system, and/or from transportation authorities, such as state or local government transportation authorities. In an example, information may be accessed from the other sources by the safety cloud using Application Programming Interfaces (APIs).

FIG. 3B is an example of a vehicle data message 330 that is used to communicate vehicle telemetry data from a vehicle (V1 310-1, V2 310-2, . . . . Vn 310-n) to the vehicle tracking system 306 and/or to the safety cloud 302. In the example, the vehicle data message 330 includes three fields, implemented as a vehicle ID field 332, a location information field 334, and a supplemental information field 336. The vehicle ID field 332 may indicate a vehicle ID (e.g., a multibit vehicle identifier) that is unique to each vehicle (e.g., V1 310-1, V2 310-2, and/or Vn 310-n). The location information field 334 may indicate location information that corresponds to the location of the vehicle at a particular time, e.g., timestamp and latitude and longitude coordinates as provided from an on-vehicle GPS receiver). The supplemental information field 336 may include, for example, data indicative of motion of the vehicle such as speed, acceleration, trajectory, direction, and/or azimuth of the vehicle, an indication of the type or class of vehicle, vehicle status information such as an indication that the vehicle's headlights are on, an indication that the vehicle's hazard lights are on, an indication that the vehicle's windshield wipers are on, an indication that a tire on the vehicle is flat, and indication that an airbag in the vehicle has been deployed, and/or an indication that the vehicle is park, drive, or reverse. Although the vehicle data message 330 is shown in FIG. 3B as including three fields, the vehicle data message may have more than or less than three fields that indicate the same or different information. In an embodiment, the vehicle data message 330 is sent by a vehicle (e.g., V1 310-1, V2 310-2, and/or Vn 310-n) to the vehicle tracking system 306 at regular intervals (e.g., every 2 seconds) via a wireless service provider network, and then shared with the safety cloud 302 by the vehicle tracking system. In another embodiment, the vehicle data message 330 is sent by a vehicle directly to the safety cloud via a wireless service provider network.

FIG. 3C is an example of an alerting vehicle data message 340 that is used to communicate alerting vehicle telemetry data from an alerting vehicle (AV1 308-1, AV2 308-2, . . . . AVn 308-n) to the alert tracking system 304 and/or to the safety cloud 302. In the example, the alerting vehicle data message 340 includes four fields, implemented as a vehicle ID field 342, a location information field 344, a supplemental information field 346, and an alert ID field 348. The vehicle ID field 342 may indicate a unique vehicle ID (e.g., a multibit vehicle identifier) that corresponds to an alerting vehicle (e.g., AV1 308-1, AV2 308-2, and/or AVn 308-n). The location information field 344 may indicate location information that corresponds to the location of the vehicle at a particular time (e.g., timestamp and latitude and longitude coordinates) as provided from an on-vehicle GPS receiver. The supplemental information field 346 may include, for example, data indicative of motion of the vehicle such as speed, acceleration, trajectory, direction, azimuth of the vehicle, and/or other information about the vehicle. The alert ID field 348 may include an alert ID that indicates an alerting mode of the vehicle, e.g., whether the alerting vehicle has its emergency lights on or off and/or has its emergency siren on or off. In an example, the status of the emergency/warning lights of an alerting vehicle, as indicated by the value in the alert ID, is used to establish and remove alerting zones. For example, the safety cloud may establish an alerting zone and send digital alerts to nearby vehicles accordingly when the value in the alert ID field indicates that the alerting vehicle has its warning lights on, and the safety cloud may end an alerting zone and the corresponding alerting when the value in the alert ID field indicates that the alerting vehicle no longer has its warning lights on. Although the alerting vehicle data message 340 is shown in FIG. 3C as including four fields, the alerting vehicle data message may have more than or less than four fields that indicate the same or different information. In an embodiment, the alerting vehicle data message 340 is sent by an alerting vehicle (e.g., AV1 308-1, AV2 308-2, and/or AVn 308-n) to the alert tracking system 304 via a wireless service provider network, and then shared with the safety cloud 302 by the alert tracking system. In another embodiment, the alerting vehicle data message 340 is sent by an alerting vehicle directly to the safety cloud 302 via a wireless service provider network.

Figure 3D:
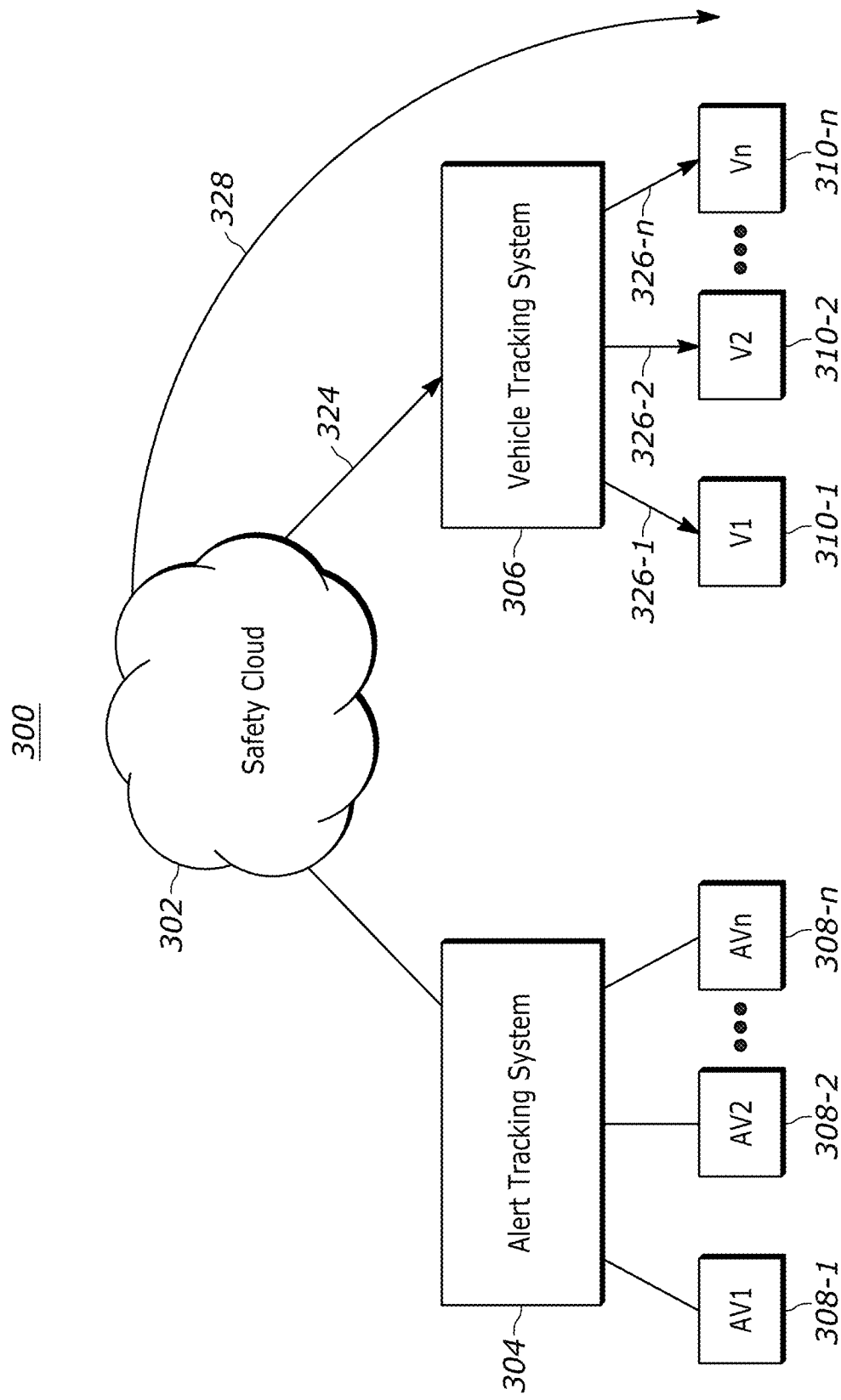
FIG. 3D illustrates the flow of data to vehicles from the safety cloud.

FIG. 3D illustrates an example of the flow of data to vehicles. The flow of data to the vehicles may represent a process for sending digital alerts to the vehicles (V1 310-1, V2 310-2, and/or Vn 310-n) also referred to as digital alerting. In particular, the example of FIG. 3D illustrates the safety system 300, including the safety cloud 302, the alert tracking system 304 that communicates with alerting vehicles AV1 308-1, AV2 308-2, and/or AVn 308-n, and the vehicle tracking system 306 that communicates with vehicles V1 310-1, V2 310-2, and/or Vn 310-n as described with reference to FIG. 3A. In contrast to FIG. 3A, the example of FIG. 3D illustrates the flow of data (e.g., digital alerts) from the safety cloud 302 to the vehicles V1 310-1, V2 310-2, and/or Vn 310-n. The safety cloud 302 may generate an alert message for transmission to vehicles V1 310-1, V2 310-2, and/or Vn 310-n when a vehicle is within an alerting zone. In an example, the safety cloud 302 sends digital alerts in the form of an alerting message to the vehicle tracking system 306 (represented by arrow 324) and the vehicle tracking system 306 sends a digital alert in the form of an alert message to corresponding vehicles V1 310-1, V2 310-2, and/or Vn 310-n via wireless connections (represented by arrows 326-1, 326-2, and 326-n). In another example, the safety cloud 302 sends a digital alert directly to a corresponding vehicle V1 310-1, V2 310-2, and/or Vn 310-n via a wireless connection (represented by arrow 328). In some embodiments, the same alert message is sent to all the vehicles that are included in the safety system 300 and within an active alerting zone. In some embodiments, an alert message is vehicle-specific, such that a different vehicle-specific alert message is sent to each of the vehicles that is within an alerting zone. In an example, digital alerts are provided to vehicles in an alerting zone enough in advance of encountering a roadway hazard that the vehicles can safely take a precautionary action such as slowing down, changing lanes, or moving over.

Figure 3E:
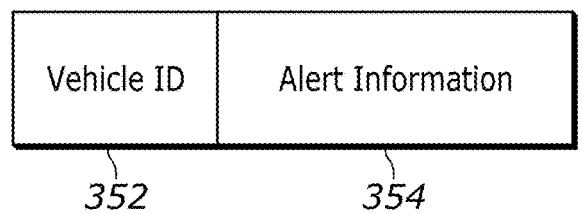
FIG. 3E depicts an example of an alert message that is generated by the safety cloud.

FIG. 3E depicts an example of a digital alert in the form of an alert message 350 that is generated by the safety cloud 302. In the example, the alert message 350 shown in FIG. 3E includes two fields, implemented as a vehicle ID field 352 and an alert information field 354. The vehicle ID field 352 may indicate a vehicle ID that is unique to each vehicle (e.g., V1 310-1, V2 310-2, and/or Vn 310-n), such that the vehicle ID is vehicle-specific. By using the vehicle ID, the alert message indicates which particular vehicle the alert message is intended for. Thus, the vehicle ID may improve the overall impact of alert messages because only the intended vehicle will recognize the digital alert as being intended specifically for that vehicle. The alert information field 354 may indicate an alert type. In one example, the alert information field 354 may be a single bit field and in other examples, the alert information field 354 may be a multibit field. In one example, there may be multiple different types of alert messages and in another example, there is only one type of alert message. In an embodiment, the alert information field 354 has a value that indicates a warning such as "beware of hazard," "fire truck ahead," "police car ahead," "tow truck ahead," "lane closure ahead," "construction ahead," or the like. Although the alert message 350 is shown in FIG. 3E as including two fields, the alert message may have more than or less than two fields that indicate the same or different information. In an embodiment, the alert message 350 is sent to the vehicle tracking system 306 by the safety cloud 302, and then sent by the vehicle tracking system to a transceiver of a vehicle (e.g., V1 310-1, V2 310-2, and/or Vn 310-n) via a wireless service provider network. In another embodiment, the alert message 350 is sent by the safety cloud to the transceiver of the vehicle via the wireless service provider network. In yet another embodiment, the alert message 350 is sent by the safety cloud to a broadcasting tower near an alerting zone via the wireless service provider network, and then sent by the broadcasting tower to the transceiver of the vehicle via a wireless service provider network.

As described above, digital alerting involves delivering a digital alert to a vehicle that may encounter a roadway hazard so that the vehicle has sufficient time to take a precautionary action to avoid the roadway hazard. For example, precautionary actions to avoid a roadway hazard may involve a vehicle slowing down, changing lanes, or moving over in response to a received digital alert. Ideally, a digital alert of a roadway hazard is provided to a nearby vehicle enough in advance of encountering the roadway hazard that the vehicle can safely take a precautionary action. For example, it may be desirable to deliver a digital alert to a vehicle around 15-20 seconds before the vehicle will encounter the roadway hazard, thus giving the vehicle enough time to take a precautionary action such as slowing down, changing lanes, or moving over.

In some cloud-based digital alerting systems, the actual distance between a roadway hazard and a vehicle can be quickly calculated using latitude and longitude coordinates of the roadway hazard and the vehicle and therefore vehicle-specific digital alerts are often provided to vehicles when the vehicles are a certain distance away from an identified roadway hazard (e.g., within a safety zone), in which the distance is calculated based on typical speeds on the particular roadway and a desired alert buffer time of, for example, 15-20 seconds. In one example, a roadway with a typical speed of 55 mph and a desired alert buffer time of 15-20 seconds translates to a desired distance between the vehicle and the roadway of about 1,200-1,600 feet. That is, it may be desirable to deliver a digital alert to a vehicle that is projected to encounter a roadway hazard when the vehicle is about 1,200-1,600 feet away from the roadway hazard. Although typical speeds on a road, a target alert buffer time, and the distance between a vehicle and a roadway hazard can be used by a safety cloud to determine when to provide a digital alert to a vehicle, there are many other factors that may affect a vehicle's ability to take a precautionary action and a one size fits all approach to the timing of digital alerts may not always be effective as some vehicles may be alerted of a roadway hazard too early, in which case the driver may forget about the alert, while other vehicles may be alerted of a roadway hazard too late, in which case a precautionary action may not be possible. For example, it may take a tanker truck longer to slow down to a safe speed than it would take a passenger vehicle and it may take all vehicles much longer to slow down on an icy road than it would take the same vehicles to slow down on the same road with perfect road conditions. However, conventional digital alerting systems typically rely on velocity information as the sole basis for controlling the timing of digital alerting, e.g., setting boundaries of an alerting zone. In view of this, it has been realized that the location of a roadway hazard, the location of a vehicle relative to the roadway hazard, and some factor that is known by a safety cloud and that affects the ability of the vehicle to take a precautionary action can be used by the safety cloud to determine when to output a vehicle-specific digital alert about the roadway hazard. For example, information received at a safety cloud that indicates the type of vehicle (e.g., passenger vehicle or tanker truck) or that indicates an operating state of the vehicle (e.g., windshield wipers on), and/or other information known to the cloud safety system such as current weather conditions, daylight conditions, and/or road surface conditions (e.g., icy) can be used in real time by the safety cloud to dynamically set the timing of a vehicle-specific digital alert about a roadway hazard to improve the likelihood that the alerted vehicle is able to effectively implement a precautionary action and therefore avoid an incident with the roadway hazard. In one example, information that a vehicle is a tanker truck and/or information that a vehicle is on an icy road can be used by the safety cloud to dynamically increase the alert buffer time beyond a typical 15-20 seconds to allow a vehicle more time to take a precautionary action before encountering the roadway hazard.

Figure 4:
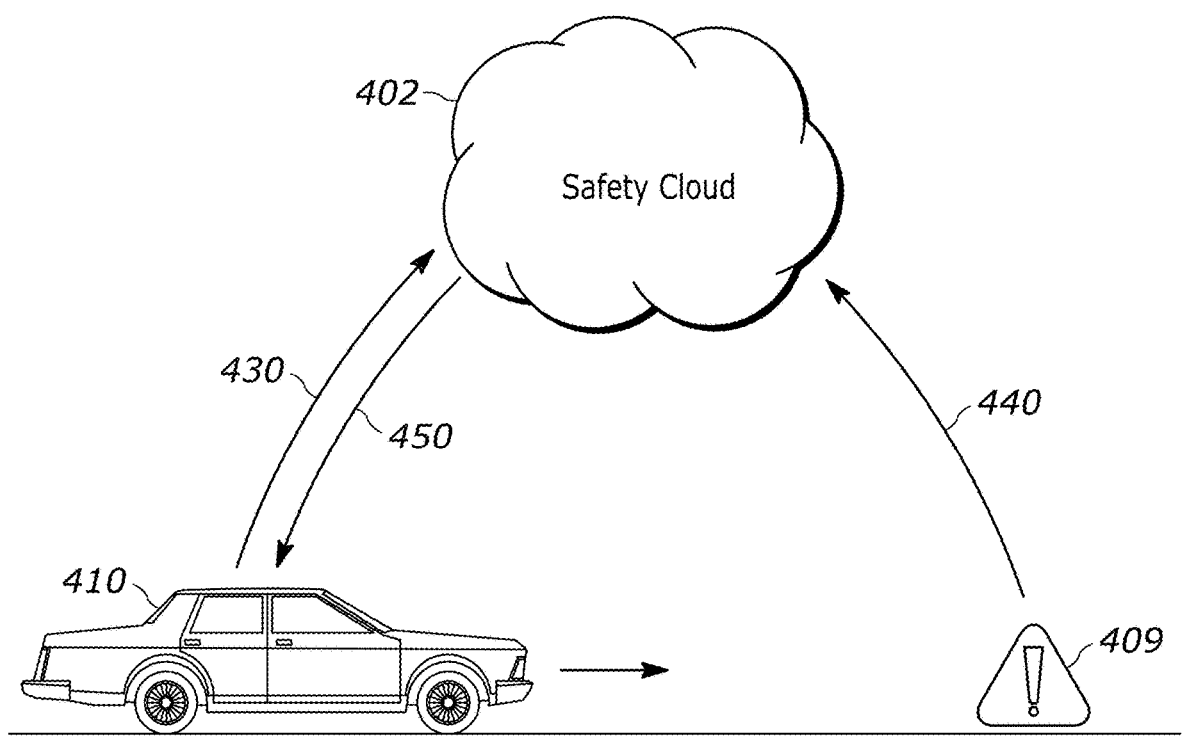
FIG. 4 illustrates an example of a vehicle-specific digital alert being provided to a vehicle from a safety cloud to alert the vehicle of a roadway hazard.

FIG. 4 illustrates an example of a vehicle-specific digital alert 450 being provided to a vehicle 410 from a safety cloud 402 to alert the vehicle of a roadway hazard 409, e.g., an emergency vehicle with its emergency lights on or a disabled vehicle. It should be noted that FIG. 4 is not to scale. In the example, the safety cloud receives digital data about the roadway hazard that includes location information about the roadway hazard and digital data from the vehicle that includes location information about the vehicle. For example, the digital data about the roadway hazard is provided to the safety cloud in at least one vehicle data message 440 as described with reference to FIG. 3C and the digital data about the vehicle is provided from the vehicle in at least one vehicle data message 430 as described with reference to FIG. 3B. Upon receiving the digital data, the safety cloud determines when to output a vehicle-specific digital alert 450 about the roadway hazard based on the location of the roadway hazard, the location of the vehicle, and a factor that is known by the safety cloud and that affects the ability of the vehicle to take a precautionary action. A vehicle-specific digital alert is output from the safety cloud according to the determination. For example, the vehicle-specific digital alert is output from the safety cloud enough in advance of the vehicle encountering the roadway hazard that the vehicle can safely take a precautionary action such as slowing down, changing lanes, and/or moving over. Although examples of the roadway hazard are an emergency vehicle with its warning lights on and a disabled vehicle, other types of roadway hazards are possible. For example, roadway hazards may include vehicle hazards such as police cars, fire trucks, ambulances, tow trucks, school buses, and mail trucks, non-vehicle hazards such as construction zones, roadside hazards, and natural phenomena such as ice, water, wildfires, and floods. Additionally, information about the location and/or type of roadway hazard may be provided to the safety cloud directly from the roadway hazard, from another source, or from some combination thereof.

As described above, there are many factors that can be known by the safety cloud and that can affect the ability of a vehicle to take a precautionary action, including vehicle-specific factors and/or non-vehicle specific factors. Various examples of such factors are described herein.

Information that is specific to a particular vehicle and that can be known by a safety cloud and that can affect the ability of a vehicle to take a precautionary action include, for example, vehicle location, vehicle speed, a vehicle Identifier (from which the safety cloud can infer a vehicle type, weight, performance, etc.), a state of a vehicle (windshield wipers on, headlights on, fog lights on), a current vehicle weight (e.g., from an on-vehicle sensor, from a weigh station, or manual input from driver), a current road friction measurement (e.g., from an on-vehicle sensor), current traffic conditions (e.g., from an on-vehicle sensor), driver/occupant information (e.g., age, vitals, history, attention/distracted, passengers (children), insurance rating/score). In some cases, at least some of the above-identified information may be provided to the safety cloud from the vehicles themselves via vehicle data messages (e.g., see FIG. 3B). In other cases, at least some of the above-identified information is provided to the safety cloud, or obtained by the safety cloud, from other sources.

In one example, the weight of a vehicle is a physical parameter that may be known to the safety cloud and that affects the ability of the vehicle to take precautionary actions. In an example, if direct weight information of a vehicle is not available to the safety cloud, the fullness of a load (e.g., the fullness of a tank of a tanker truck) can be a proxy for the weight of the vehicle. Thus, fullness of a load may be a factor that is known by the safety cloud and that affects the ability of the vehicle to take a precautionary action. In some cases, the weight information may be provided to the safety cloud from the vehicles themselves via vehicle data messages (e.g., see FIG. 3B). In other cases, at least some of the above-identified information is provided to the safety cloud, or obtained by the safety cloud, from other sources.

Information that can be obtained by the safety cloud but that may not be specific to a particular vehicle may include, for example, current weather (e.g., raining, cold, icy, foggy, smokey etc.), time of day (from which visibility can be estimated, e.g., lightness/darkness), type of road the vehicle is on or predicted to be on (e.g., straight, curved, hill, known blind spot), road conditions (e.g., wet, icy, traffic load, from road sensor(s), from a transportation agency, and/or from nearby vehicles). The information may be provided from a variety of different sources, including third-party sources such as commercial mapping entities (WAZE®, GOOGLE® Maps, APPLE® Maps), weather entities (e.g., government or private sources of weather information), vehicle manufacturers that maintain a vehicle tracking system, and/or from transportation authorities, such as state or local government transportation authorities. In an example, such information can be accessed by the safety cloud via the internet through APIs. Such information can be used by the safety cloud as a factor in determining when to output a vehicle-specific digital alert about a roadway hazard by linking the factor to a specific vehicle using at least some of the digital data that is provided to the safety cloud from the vehicle. For example, location information provided to the safety cloud from a vehicle may be used to determine weather conditions or road conditions that correspond to the vehicle and/or a timestamp corresponding to the digital data provided from the vehicle may be used to determine a time of day and thus visibility (e.g., lightness/darkness) that corresponds to the vehicle.

As indicated above, there are a variety of factors that can be known to the safety cloud and that can be used to determine when to output vehicle-specific digital alerts to vehicles regarding roadway hazards. In addition to any one of the factors being used by the safety cloud to determine when to output a vehicle-specific digital alert, a combination of factors may be used to determine when to output a vehicle-specific digital alert. For example, information that indicates a vehicle is a tanker truck and information (e.g., location and timestamp) that indicates the corresponding road is icy may be used in combination by the safety cloud to determine when to output a vehicle-specific digital alert to the tanker truck. In another example, information about the location of the vehicle can be used by the safety cloud to determine the current weather conditions around the vehicle and information about the current time can be used by the safety cloud to determine the current visibility (e.g., lightness/darkness). In another example, information provided from a vehicle about the driver of the vehicle may be used by the safety cloud to identify some additional information about the driver, such as the driver's age, driving history, and/or an insurance rating/score, which may then be used to determine when to output a vehicle-specific digital alert. For example, a driver that is in an age range of 30-60 years old may correspond to a first factor that is considered by the safety cloud for the timing of digital alerting while a driver that is younger than 30 years old or older than 60 years old may correspond to a second factor that is considered by the safety cloud for the timing of digital alerting. In one example, drivers in the less than 30 and greater than 60 age range may be alerted earlier than drivers in the 30-60 year old age range.

Figure 5:
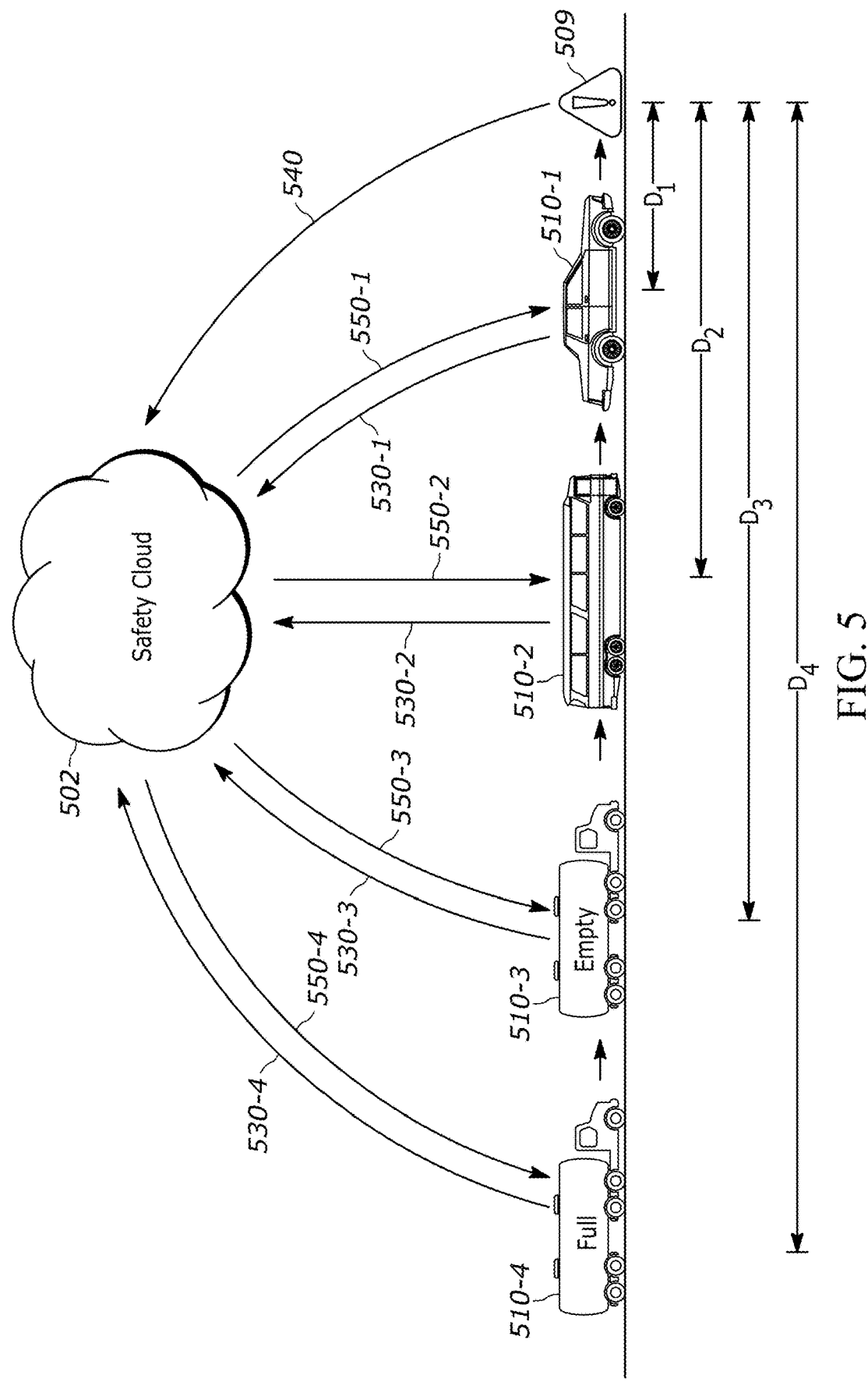
FIG. 5 illustrates an example of how vehicle-specific digital alerting is influenced by factors that are known to the safety cloud and that can affect when vehicle-specific digital alerts are provided to vehicles from the safety cloud.

FIG. 5 illustrates an example of how vehicle-specific digital alerting is influenced by factors that are known to the safety cloud 502 and that can affect when vehicle-specific digital alerts are provided to vehicles from the safety cloud. FIG. 5 is not to scale. In the example of FIG. 5, four different vehicles 510-1, 510-2, 510-3, and 510-4 are predicted to encounter the same roadway hazard 509. For example, each of the four vehicles is determined to be within an alerting zone of the same roadway hazard. In the example of FIG. 5, the four vehicles include a midsize passenger vehicle 510-1, a multi-passenger bus 510-2, a tanker truck 510-3 with an empty tank, and a tanker truck 510-4 with a full tank, e.g., a tank full of liquid. Additionally, in the example of FIG. 5, it is assumed that digital data received at the safety cloud about the vehicles includes a location of each vehicle (e.g., latitude and longitude coordinates and a timestamp), an indication of the type of vehicle (e.g., midsize passenger vehicle, multi-passenger bus, and tanker truck), and with regard to the tanker trucks, some indication of the magnitude of the load, e.g., a number of pounds, a number of gallons, an indication of fullness (one-quarter full, half full, three-quarters full, full). At least some of the information, including vehicle location information, is provided to the safety cloud from the vehicles via vehicle data messages, 530-1, 530-2, 530-3, and 530-4, as described with reference to FIG. 3B. From the location information about the roadway hazard (e.g., latitude/longitude coordinates received via data message 540), the location information about the vehicles (latitude/longitude coordinates), and a factor that is known by the safety cloud and that affects the ability of the vehicles to take a precautionary action, the safety cloud determines when to output vehicle-specific digital alerts about the roadway hazard.

With regard to the passenger vehicle 510-1, the safety cloud 502 determines when to output a vehicle-specific digital alert 550-1 based on the location of the roadway hazard 509, the location of the passenger vehicle, and based on the safety cloud's knowledge that the vehicle is a midsize passenger vehicle. Armed with this knowledge, the safety cloud determines that a vehicle-specific digital alert should be output from the safety cloud when the midsize passenger vehicle is a distance, $D_1$, from the roadway hazard. FIG. 5 illustrates a digital alert, such as the digital alert described with reference to FIG. 3E, being provided to the midsize passenger vehicle via the safety cloud when the midsize passenger vehicle is a distance, $D_1$, from the roadway hazard. In an example, the distance, $D_1$, is calculated based on the time it would take for the passenger vehicle to safely take a precautionary action assuming the midsized passenger vehicle is traveling at or near the posted speed limit or at a speed that is typical of the corresponding road. In another example, the distance, $D_1$, could be calculated based on the actual speed of the vehicle, which could be obtained directly from a vehicle data message if available, or estimated from a time-sequence of vehicle data messages.

With regard to the multi-passenger bus 510-2, the safety cloud 502 determines when to output a vehicle-specific digital alert 550-2 based on the location of the roadway hazard 509, the location of the multi-passenger bus, and based on the safety cloud's knowledge that the vehicle is a multi-passenger bus. Armed with this knowledge, the safety cloud determines that a vehicle-specific digital alert should be output from the safety cloud when the multi-passenger bus is a distance, $D_2$, from the roadway hazard. FIG. 5 illustrates a digital alert, such as the digital alert described with reference to FIG. 3E, being provided to the multi-passenger bus via the safety cloud when the multi-passenger bus is a distance, $D_2$, from the roadway hazard. In an example, the distance, $D_2$, is calculated based on the time it would take for the bus to safely take a precautionary action assuming the bus is traveling at or near the posted speed limit or at a speed that is typical of the corresponding road. In another example, the distance, $D_2$, could be calculated based on the actual speed of the bus, which could be obtained directly from a vehicle data message if available, or estimated from a time-sequence of vehicle data messages. Since the bus is likely much heavier than the passenger vehicle, it is assumed that the bus needs more time and/or distance to take a precautionary action. Thus, as illustrated in FIG. 5, the distance, $D_2$, is larger than the distance, $D_1$.

With regard to the tanker truck 510-3 with an empty tank, the safety cloud 502 determines when to output a vehicle-specific digital alert 550-3 based on the location of the roadway hazard 509, the location of the tanker truck, and based on the safety cloud's knowledge that the vehicle is a tanker truck with an empty tank. Armed with this knowledge, the safety cloud determines that a vehicle-specific digital alert should be output from the safety cloud when the tanker truck is a distance, $D_3$, from the roadway hazard. FIG. 5 illustrates a digital alert, such as the digital alert described with reference to FIG. 3E, being provided to the tanker truck via the safety cloud when the tanker truck is a distance, $D_3$, from the roadway hazard. In an example, the distance, $D_3$, is calculated based on the time it would take for the tanker truck to safely take a precautionary action assuming the tanker truck is traveling at or near the posted speed limit or at a speed that is typical of the corresponding road. In another example, the distance, $D_3$, could be calculated based on the actual speed of the tanker truck, which could be obtained directly from a vehicle data message if available, or estimated from a time-sequence of vehicle data messages. Since the tanker truck is likely much heavier than the passenger vehicle and possibly heavier than the multi-passenger bus, it is assumed that the tanker truck needs more time and/or distance to take a precautionary action. Thus, as illustrated in FIG. 5, the distance, $D_3$, is larger than the distance, $D_1$, and the distance, $D_2$.

With regard to the tanker truck 510-4 with a full tank, the safety cloud 502 determines when to output a vehicle-specific digital alert 550-4 based on the location of the roadway hazard 509, the location of the tanker truck, and based on the safety cloud's knowledge that the vehicle is a tanker truck with a full tank. Armed with this knowledge, the safety cloud determines that a vehicle-specific digital alert should be output from the safety cloud when the tanker truck is a distance, $D_4$, from the roadway hazard. FIG. 5 illustrates a digital alert, such as the digital alert described with reference to FIG. 3E, being provided to the tanker truck via the safety cloud when the tanker truck is a distance, $D_4$, from the roadway hazard. In an example, the distance, $D_4$, is calculated based on the time it would take for the tanker truck to safely take a precautionary action assuming the tanker truck is traveling at or near the posted speed limit or at a speed that is typical of the corresponding road. In another example, the distance, $D_4$, could be calculated based on the actual speed of the tanker truck, which could be obtained directly from a vehicle data message if available, or estimated from a time-sequence of vehicle data messages. Since the tanker truck with a full tank is much heavier than the tanker truck with an empty tank, it is assumed that the tanker truck with the full tank needs more time and/or distance to take a precautionary action. Thus, as illustrated in FIG. 5, the distance, $D_4$, is larger than the distance, $D_3$.

As illustrated in FIG. 5, the determinations of when to output vehicle-specific digital alerts 550-1, 550-2, 550-3, and 550-4 about the roadway hazard 509 are made based on the location of the roadway hazard, the location of each vehicle, and based on some factor that is known by the safety cloud and that affects the ability of each particular vehicle to take a precautionary action. For example, the factor that is known by the safety cloud and that affects the ability of each particular vehicle to take a precautionary action in the example of FIG. 5 is knowledge about the type of vehicle that is the target of the digital alert, and an additional factor that is known by the safety cloud may be some knowledge of the weight of the vehicle in the case of the tanker trucks. In an example, the information is provided to the safety cloud via vehicle data messages that originate from the vehicles that are to receive the vehicle-specific digital alerts. Given the rich set of knowledge about roadway hazards and about vehicles that are within an alerting zone of such roadway hazards that can be known by the safety cloud, the safety cloud is able to dynamically determine on a vehicle-by-vehicle basis when to provide vehicle-specific digital alerts to vehicles. Providing vehicle-specific digital alerts that take into account factors that affect the ability of the vehicles to take precautionary actions can improve the timeliness of digital alerts so that digital alerts are not delivered too early, in which case the driver may forget about the alert, or too late, in which case a precautionary action may not be possible. Implementing such an approach at a safety cloud can greatly improve roadway safety.

Figure 6:
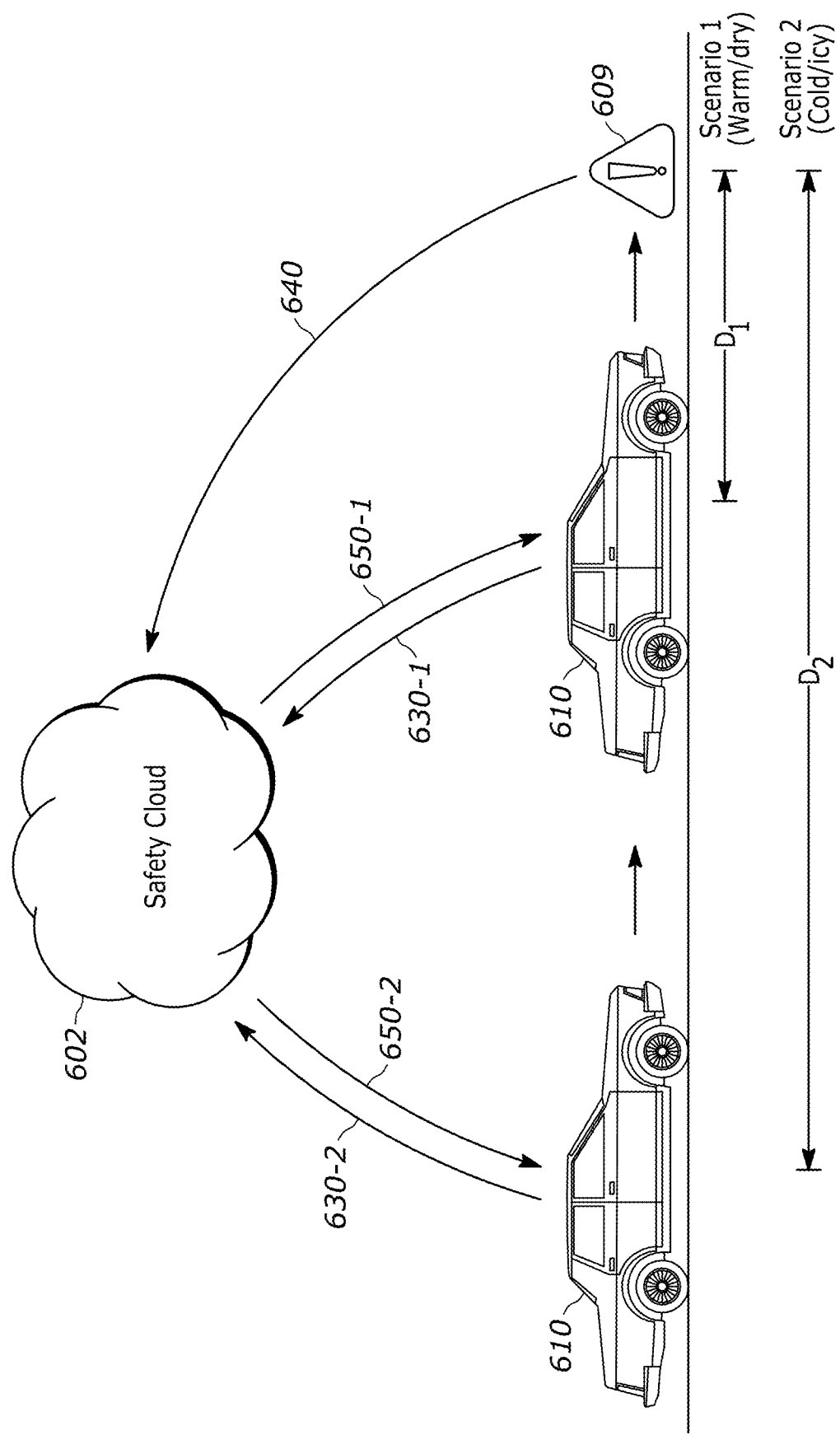
FIG. 6 illustrates another example of how factors that are known to the safety cloud can affect when vehicle-specific digital alerts are provided to vehicles from the safety cloud.

In the example illustrated in FIG. 5, the factor that is known by the safety cloud and that affects the ability of the vehicle to take a precautionary action is a factor that is specific to each vehicle (e.g., emanates from the vehicle). However, in other examples, a factor that is known to the safety cloud and that affects the ability of the vehicle to take a precautionary action may be a factor that may apply to multiple vehicles, e.g., multiple vehicles that are within the alert zone of the same roadway hazard. For example, such a factor may include the current weather conditions, the time of day (light/dark), type of road, road conditions, and/or traffic conditions. FIG. 6 illustrates another example of how factors that are known to the safety cloud 602 can affect when vehicle-specific digital alerts 650-1 and 650-2 are provided to vehicles from the safety cloud. In particular, FIG. 6 illustrates how digital alerting may be influenced by weather conditions and/or road conditions that can be obtained by the safety cloud. FIG. 6 is not to scale. With reference to FIG. 6, two scenarios are overlayed against each other in which a vehicle 610 is alerted of a roadway hazard 609 that is at the same location and on the same stretch of road. In the first scenario, the safety cloud knows the location of the vehicle based on digital data 630-1 received from the vehicle and the safety cloud knows that the current weather corresponding to the location of the vehicle is warm and/or that the road that the vehicle is on is currently dry. The safety cloud may obtain knowledge about the weather conditions and road conditions from any source, including, for example, publicly available sources of weather conditions and publicly available sources of road conditions and can link the weather conditions and/or road conditions to the vehicle using knowledge about the vehicle's location that is received at the safety cloud. Given the combined information known by the safety cloud in scenario one, the safety cloud determines that the timing of the vehicle-specific digital alert 650-1 is a function of a distance, $D_1$. That is, the vehicle-specific digital alert is output from the safety cloud at a time when the vehicle is a distance, $D_1$, away from the roadway hazard. The distance, $D_1$, may be a preestablished distance or a distance that is calculated as a function of the speed of the vehicle and/or as a function of the speed class of the road.

In the second scenario, the safety cloud 602 knowns the location of the vehicle 610 based on digital data 630-2 received from the vehicle and the safety cloud knows that the current weather corresponding to the location of the vehicle is cold (e.g., below freezing) and/or that the road that the vehicle is on is currently icy. Again, the safety cloud may obtain knowledge about the weather conditions and road conditions from any source, including, for example, publicly available sources of weather conditions and publicly available sources of road conditions. Given the combined information known by the safety cloud in scenario two, the timing of the vehicle-specific digital alert 650-2 is a function of a distance, $D_2$. That is, the vehicle-specific digital alert is output from the safety cloud at a time when the vehicle is a distance, $D_2$, away from the roadway hazard. The distance, $D_2$, may be a preestablished distance or a distance that is calculated as a function of the speed of the vehicle and the cold and/or icy conditions and/or as a function of the speed class of the road and the cold and/or icy conditions. In one example, the distance, $D_2$, is calculated as a function of the distance, $D_1$, with some margin of safety added to account for the cold and/or icy conditions. For example, the distance, $D_2$, may be calculated by adding an additional 40% safety margin to the distance, $D_1$ (e.g., $D_{2=1.4} \times D_1$). In another example, a margin of safety may be a function of time such that a desired alert time buffer is increased from 15-20 seconds to 30-45 seconds, although other examples are possible.

As illustrated in FIG. 6, the distance, $D_2$, at which the vehicle 610 is digitally alerted in cold and/or icy conditions is greater than the distance, $D_1$, at which the vehicle is digitally alerted in good conditions so that the vehicle has a greater distance and/or more time to take a precautionary action before encountering the roadway hazard. That is, the safety cloud 602 can dynamically adjust the timing of digital alerting based on real time information such as weather conditions and/or road conditions that are linked to a vehicle based on the location of the vehicle to improve the effectiveness of digital alerting. Thus, the safety cloud is able to dynamically adjust when to output a vehicle-specific digital alert based on the location of the hazard, the location of the vehicle, and at least one factor that affects the ability of the vehicle to take a precautionary action, where the at least one factor that is known to the safety cloud is a weather condition factor and/or a road condition factor that corresponds to the vehicle. Again, given the rich set of knowledge about roadway hazards and about vehicles that are within an alerting zone of such roadway hazards that can be known by the safety cloud, the safety cloud is able to dynamically determine, on a vehicle-by-vehicle basis, when to provide vehicle-specific digital alerts to vehicles. Implementing such an approach at a safety cloud can greatly improve roadway safety.

In one example, the timing of digital alerting is determined from a baseline calculation of a separation distance that is a function of speed (e.g., a speed class of a road or a current speed of a vehicle) and an alert time buffer. In one example, a baseline distance at which a vehicle-specific digital alert about a roadway hazard should be delivered to a vehicle travelling at 55 mph to give the vehicle at least 15 seconds before encountering the roadway hazard to take a precautionary action is calculated as:

$$55 \text{ miles/hour} \times 5{,}280 \text{ feet/mile} \times 1 \text{ hour}/3{,}600 \text{ seconds} \times 15 \text{ seconds} = 1{,}210 \text{ feet}.$$

According to this calculation, a vehicle is provided a vehicle-specific digital alert when the vehicle is about 1,210 feet away from the roadway hazard. In an example, such a calculation is used to define boundaries of an alerting zone.

FIG. 7 is a table 700 of example baseline distances that are calculated for different speeds, speed ranges, alert buffer times, and alert buffer time ranges. As shown in the table of FIG. 7, in one example for a vehicle travelling at a speed (velocity) of 25 mph and an alert buffer time of 15-20 seconds, the desired separation distance between the vehicle and the roadway hazard is in the range of 550-733 feet. That is, the safety cloud should output a vehicle-specific digital alert for a vehicle travelling at 25 mph when the vehicle is between 550-733 feet away from the roadway hazard, e.g., where the distance is measured along a path that the vehicle is predicted to take. Other examples of baseline separation distances are provided for different combinations of speed, speed ranges, alert buffer times, and/or alert buffer time ranges. Although some examples of baseline separation distances are provided, other examples are possible. In an example, the information in the table of FIG. 7 is held in memory at the safety cloud or calculated on the fly by the safety cloud as needed.

As described above, at least one factor corresponding to a vehicle that affects the ability of the vehicle to take a precautionary action is considered to determine when to output a vehicle-specific digital alert from the safety cloud. In one implementation, factors that affect the ability of the vehicle to take a precautionary action are considered relative to a baseline separation distance to determine when to output a digital alert. For example, a baseline separation distance is set based on a speed (e.g., a speed class of a road, or a particular speed) and a preestablished alert buffer time and the baseline may or may not be adjusted by the safety cloud based on some factor that corresponds to the vehicle and that is known by the safety cloud. For example, the baseline separation distance is established as a minimum separation distance with good road conditions and the safety cloud can make an adjustment to the baseline separation distance on a vehicle-by-vehicle basis to determine when to output a vehicle-specific digital alert to a specific vehicle. FIG. 8 is a table 800 that includes example baseline ratings and corresponding adjustments that are made to, for example, a baseline separation distance. In the example table, the first column includes baseline ratings of baseline, baseline+, baseline++, baseline+++, baseline++++, and baseline+++++, and the second column includes corresponding adjustments of n/a, add 20%, add 40%, add 60%, add 80%, and add 100%. Although some examples of baseline adjustments are provided, other examples are possible. In an example, the information in the table of FIG. 8 is held in memory at the safety cloud.

In an example implementation, factors that affect that ability of the vehicle to take a precautionary action are stored by the safety cloud along with corresponding baseline ratings. FIG. 9 is a table 900 of examples of factors and corresponding baseline ratings that can be used by the safety cloud to determine when to output vehicle-specific digital alerts. In operation, the safety cloud may use information known to the safety cloud to link a factor to a vehicle that is within an alerting zone and that is to receive a vehicle-specific digital alert. In an example, the information in the table of FIG. 9 is held in memory at the safety cloud. In one example, baseline ratings are manually configured in the safety cloud based on human experience and in other examples, baseline ratings may be automatically configured using, for example, machine learning (ML)/artificial intelligence (AI) techniques.

In an example, from a vehicle identifier received at the safety cloud about a vehicle, the safety cloud may determine that the vehicle is a passenger vehicle and that the corresponding baseline rating for the passenger vehicle is baseline. Thus, the vehicle-specific digital alert will be output using a baseline separation distance that corresponds to the speed class of the road that the vehicle is on or to the speed of the vehicle. For example, if the vehicle is on a road with a 60-80 mph speed class (e.g., determined from location information received at the safety cloud) and the pre-established alert buffer time is 15-20 seconds, then the baseline separation distance will be 1,320-2,347 feet.

In another example, from a vehicle identifier received at the safety cloud about a vehicle, the safety cloud may determine that the vehicle is a semi-trailer truck and that the corresponding baseline rating for the semi-trailer truck is baseline+++. Thus, the vehicle-specific digital alert will be output using a baseline+++ separation distance that corresponds to the speed class of the road that the vehicle is on or to the speed of the vehicle. For example, if the vehicle is on a road with a 60-80 mph speed class (e.g., determined from location information received at the safety cloud) and the alert buffer time is 15-20 seconds, then the desired separation distance will be 2,112 (1.6×1,320)–3,755 (1.6× 2,347) feet.

In another example, from a vehicle identifier received at the safety cloud about a vehicle, the safety cloud may determine that the vehicle is a multi-passenger bus and that the corresponding baseline rating for the multi-passenger bus is baseline++. Thus, the vehicle-specific digital alert will be output using a baseline++ separation distance that corresponds to the speed class of the road that the vehicle is on or to the speed of the vehicle. For example, if the vehicle is on a road with a 60-80 mph speed class (e.g., determined from location information received at the safety cloud) and the alert buffer time is 15-20 seconds, then the desired separation distance will be 1,848 (1.4×1,320)–3,286 (1.4× 2,347) feet.

In another example, from digital data received at the safety cloud from the vehicle, the safety cloud may determine that the vehicle has its windshield wipers on and that the corresponding baseline rating for the vehicle is baseline+. Thus, the vehicle-specific digital alert will be output using a baseline+ separation distance that corresponds to the speed class of the road that the vehicle is on or to the speed of the vehicle. For example, if the vehicle is on a road with a 60-80 mph speed class (e.g., determined from location information received at the safety cloud) and the alert buffer time is 15-20 seconds, then the desired separation distance will be 1,848 (1.2×1,584)–2,816 (1.2×2,347) feet.

In another example, from digital data received at the safety cloud from the vehicle, the safety cloud may determine that the vehicle has its headlights on and that the corresponding baseline rating for the vehicle is baseline+. Thus, the vehicle-specific digital alert will be output using a baseline+ separation distance that corresponds to the speed class of the road that the vehicle is on or to the speed of the vehicle.

In another example, from digital data received at the safety cloud from the vehicle, the safety cloud may determine that the vehicle has its fog lights on and that the corresponding baseline rating for the vehicle is baseline+++. Thus, the vehicle-specific digital alert will be output using a baseline+ separation distance that corresponds to the speed class of the road that the vehicle is on or to the speed of the vehicle.

In another example, from digital data received at the safety cloud from the vehicle, the safety cloud may determine that the vehicle is at location in which the ambient temperature is less than 10 F and that the corresponding baseline rating for the vehicle is baseline+++. Thus, the vehicle-specific digital alert will be output using a baseline+++ separation distance that corresponds to the speed class of the road that the vehicle is on or to the speed of the vehicle.

In another example, from digital data received at the safety cloud from the vehicle, the safety cloud may determine that the vehicle is at location in which it is nighttime and that the corresponding baseline rating for the vehicle is baseline+. Thus, the vehicle-specific digital alert will be output using a baseline+ separation distance that corresponds to the speed class of the road that the vehicle is on or to the speed of the vehicle.

In an example, there may be more than one factor that is known by the safety cloud and that affects the ability of a vehicle to take a precautionary action. For example, digital data received at the safety cloud from the vehicle may indicate that the vehicle is at location in which the ambient temperature is less than 10 F (corresponding baseline rating of baseline+++) and that the vehicle has its headlights on (corresponding baseline rating of baseline+). In this case, the safety cloud may take the most conservative baseline rating of baseline+++ and adjust the separation distance accordingly. For example, if the vehicle is on a road with a 60-80 mph speed class and the alert buffer time is 15-20 seconds, then the desired separation distance will be 2,112 (1.6×1, 320)–3,755 (1.6×2,347) feet.

As shown from the examples above, the safety cloud is able use a rich set of knowledge to customize the timing of digital alerting on a vehicle-by-vehicle basis. For example, the safety cloud uses some factor other than, or in addition to, the speed of the vehicle, or the speed class of the road on which the vehicle is traveling, to determine when to output a vehicle-specific digital alert. Thus, the technique does not rely on a one size fits all approach to the timing of digital alerting. In an example, the above-described logic is implemented at the safety cloud through execution of computer-readable instructions that are configured to implement vehicle-specific digital alerting as described herein. Although an example of how to implement vehicle-specific digital alerting at a safety cloud using baseline ratings is described herein, vehicle-specific digital alerting at a safety cloud can be implemented in other ways.

Figure 10:
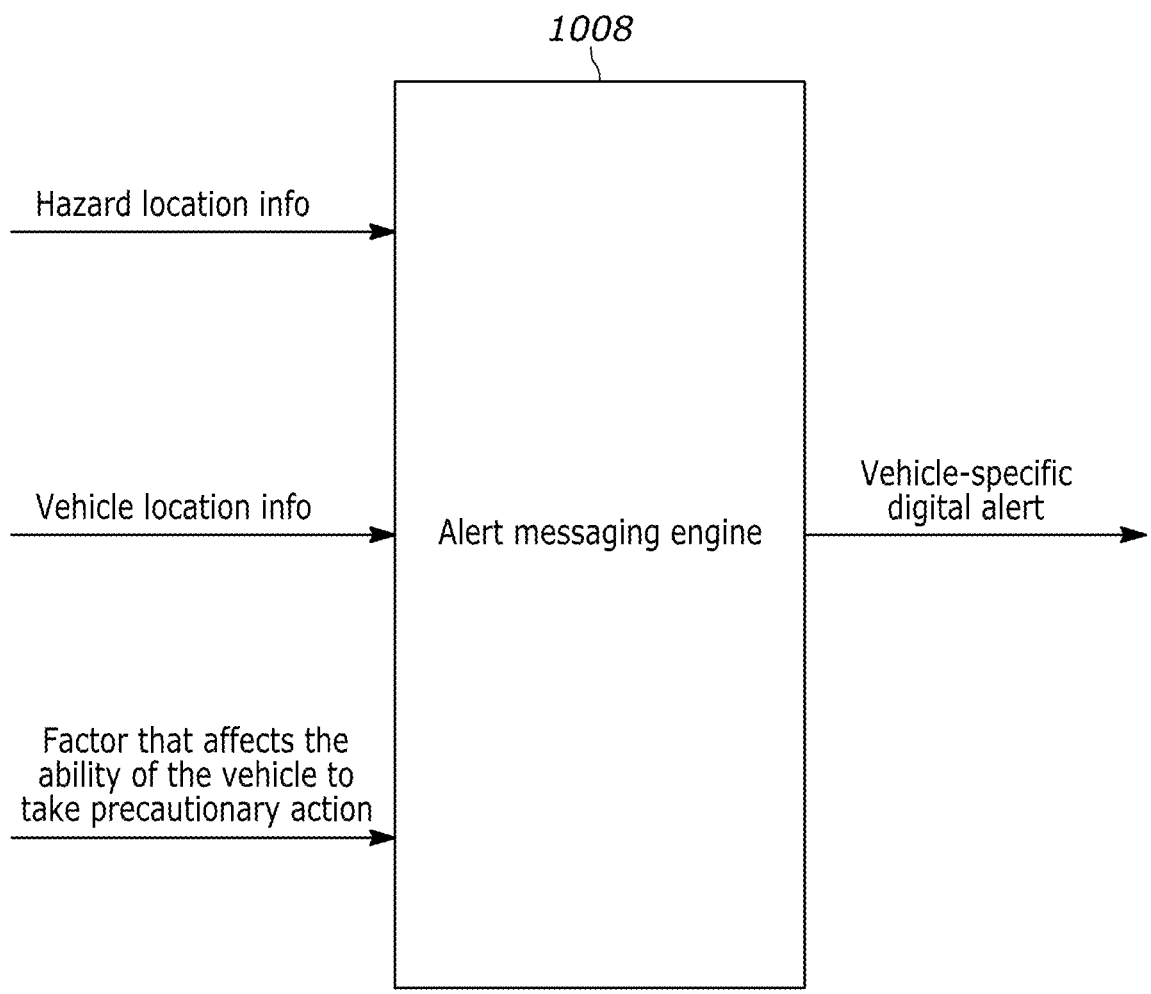
FIG. 10 illustrates examples of inputs and outputs to an alert messaging engine of a safety cloud.

FIG. 10 illustrates an example of inputs and outputs to an alert messaging engine 1008 of a safety cloud. In the example, the alert messaging engine receives hazard location information, vehicle location information, and at least one factor that affects the ability of the vehicle to take a precautionary action. In an example, the hazard location information and the vehicle location information can be used to determine which vehicles, if any, should receive digital alerts about the roadway hazard. For example, the alert messaging engine may establish an alerting zone and output vehicle-specific digital alerts to vehicles that are within the alerting zone. In addition to determining which vehicles fall within an alerting zone, the alert messaging engine determines when to output vehicle-specific digital alerts about the roadway hazard based on the location of the roadway hazard, the location of each specific vehicle, and at least one factor that is known by the alert messaging engine and that affects the ability of the vehicle to take a precautionary action. For example, the alert messaging engine may consider at least one of the factors described with reference to FIG. 9 in determining when to output a vehicle-specific digital alert. Upon making such a determination, a vehicle-specific digital alert is output from the alert messaging engine. For example, a digital alert may include a message as described with reference to FIG. 3E. In an example, the alert messaging engine is implemented in the safety cloud via computer readable instructions that are executed by a processor, or processors, of the safety cloud.

Figure 11:
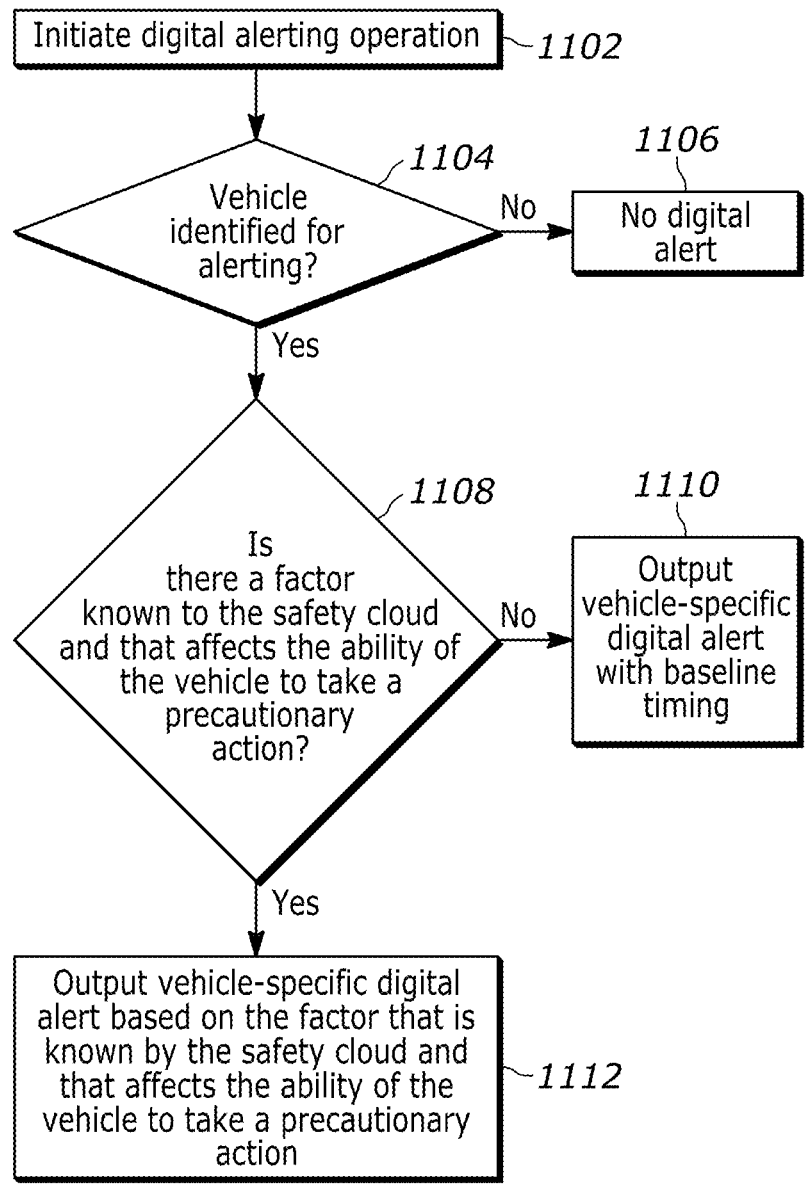
FIG. 11 is an example process flow diagram of a computer-implemented method for alerting vehicles.

FIG. 11 is an example process flow diagram of a computer-implemented method for alerting vehicles. At block 1102, a digital alerting operation is initiated. For example, the digital alerting operation is initiated in response to the safety cloud receiving an alerting message such as described with reference to FIG. 3C. Next, at decision point 1104, it is determined if a vehicle has been identified for digital alerting. For example, the safety cloud determines if a vehicle is within an alerting zone of a roadway hazard. If no vehicle has been identified for digital alerting, then at block 1106, no digital alert is output from the safety cloud. However, if a vehicle has been identified for digital alerting, the process proceeds to decision point 1108. At decision point 1108, it is determined if there is a factor that is known to the safety cloud and that affects the ability of the vehicle to take a precautionary action. If there is no factor that is known to the safety cloud that affects the ability of the vehicle to take a precautionary action, then at block 1110, the safety cloud outputs a vehicle-specific digital alert according to a baseline timing. For example, the safety cloud determines when to output the vehicle-specific digital alert based on a speed class of the road that the vehicle is on and a preestablished alert time buffer (e.g., 15-20 seconds before encountering the roadway hazard). However, if there is a factor that is known to the safety cloud that affects the ability of the vehicle to take a precautionary action, then at block 1112, the safety cloud outputs a vehicle-specific digital alert based on the factor that is known to the safety cloud that affects the ability of the vehicle to take a precautionary action. For example, the safety cloud determines when to output the vehicle-specific digital alert based on an adjustment to a baseline timing that is determined in response to the factor. For example, the safety cloud may increase the alert buffer time by a safety margin that corresponds to the known factor as described with reference to FIGS. 7-9. In an example, the above-described logic is implemented at the safety cloud through execution of computer-readable instructions that are configured to implement vehicle-specific digital alerting as described herein.

Although some examples of factors that affect the ability of a vehicle to take a precautionary action and corresponding adjustments to alert timing are described above, other examples are possible. In one example, a baseline separation distance for a typical Class 8 truck on a dry road is calculated as: 45 seconds x vehicle speed, where "typical" corresponds to a certain weight range for that size vehicle. In an implementation at the safety cloud, for every 200 pounds of extra weight for such a vehicle, which is known by the safety cloud, the separation distance is calculated by increasing the alert buffer time by 1 second. Thus, for a vehicle that is 200 pounds heavier than the typical Class 8 truck, the baseline separation distance could be calculated as: 46 seconds x vehicle speed. Additionally, for every 200 pounds of weight below the typical weight for such a vehicle, which is known by the safety cloud, the separation distance is calculated by decreasing the alert buffer time by 1 second. Thus, for a vehicle that is 200 pounds lighter than the typical Class 8 truck, the baseline separation distance could be calculated as: 44 seconds x vehicle speed, with a lower limit of for example, 30 seconds. In another example, if a road friction value that is known to the safety cloud is characterized as "minor slipperiness," the alert buffer time may be increased by 5 seconds over a preestablished alert time buffer. Further, the alert buffer time may be increased by 5 seconds for every x % degradation in the road friction value, wherein x is an integer greater than zero that is configurable. In another example, if the safety cloud knows that the vehicle's fog lights are on, the alert buffer time may be set to a default time of 60 seconds, and the separation distance could be calculated based on the speed class of the road on which the vehicle is traveling and a 60 second alert buffer time. Although some additional examples of factors that can be known to a safety cloud and that affect the ability of a vehicle to take a precautionary action are described, other factors are possible.

In an example, the type of vehicle for purposes of determining the timing of a digital alert is assumed to be a midsized passenger vehicle, unless some other type of vehicle is specifically known to the safety cloud. Thus, in this example, the midsized passenger vehicle is a default factor of the safety cloud from which vehicle-specific digital alerts can be determined.

As described above, a factor that is known to the safety cloud and that affects the ability of the safety cloud to take a precautionary action is used to determine when to output a vehicle-specific digital alert. In other examples, a factor that is known to the safety cloud and that affects the ability of safety cloud to take a precautionary action may be used to determine how to output a vehicle-specific digital alert. For example, the safety cloud may select some aspect of how a digital alert is presented within a vehicle based on such a factor. For example, the safety cloud may adjust some visual or audible aspect of a digital alert based on the factor. In some examples, the safety cloud may adjust the size, color, volume, and/or frequency of a digital alert based on a factor that is known to the safety cloud. For example, a volume indicated by a value in a digital alert message may indicate a higher volume to be used when the vehicle is a semi-truck to account for louder operating conditions of the semi-truck.

As described herein, the safety cloud may be able to learn a wide variety of factors that can be used to adapt digital alerting. Thus, the acquisition of such knowledge by the safety cloud enables intelligent and automatic decision making that can be adjusted in real-time on a vehicle-by-vehicle basis based on knowledge that is available to the safety cloud.

Figure 12:
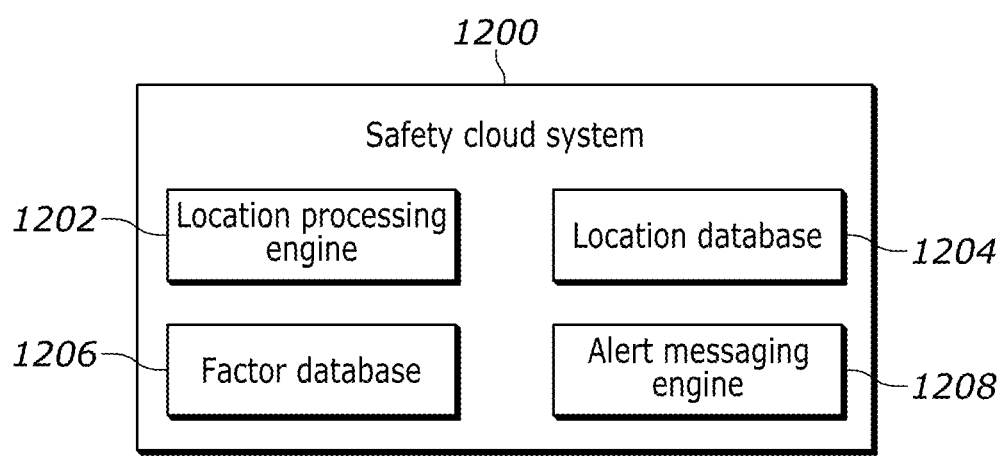
FIG. 12 is a high-level block diagram of a cloud-based safety system.

FIG. 12 is a high-level block diagram of a cloud-based safety system, referred to as safety cloud system 1200. The safety cloud system 1200 may represent an embodiment of the safety cloud 102 and 302 shown in FIGS. 1, 3A, and 3D, and/or the safety cloud system 1200 may be implemented in a cloud computing system. In the example of FIG. 12, the safety cloud system 1200 includes a location processing engine 1202, a location database 1204, a factor database 1206, and an alert messaging engine 1208. The safety cloud system may be implemented in software, in hardware, or in some combination of software and hardware.

The location processing engine 1202 may be configured to process vehicle information from vehicle data messages to determine the locations of vehicles and/or a geographical area of an alerting zone. In an embodiment, the vehicle location information and the geographical area of the alerting zone are stored in the location database 1204.

The location database 1204 may store information regarding the location of alerting vehicles, AV1 308-1, AV2 308-2, and/or AVn 308-n and/or consumer vehicles, V1 310-1, V2 310-2, and/or Vn 310-n. For example, the location database may store a database of vehicle ID information and corresponding vehicle location information.

The factor database 1206 may store information related to factors that affect the ability of a vehicle to take a precautionary action. In an example, the factor database includes information as described with reference to FIGS. 7-9.

The alert messaging engine 1208 may implement alert messaging logic as described herein. For example, the alert messaging engine may determine when to output a vehicle-specific digital alert based on the location of a roadway hazard, the location of the vehicle, and at least one factor that is known to the safety cloud and that affects the ability of the vehicle to take a precautionary action. In an example, the alert messaging system uses API calls to obtain information about a road (e.g., name, address, and/or functional classification) from a mapping service using the vehicle location information. In an embodiment, the alert messaging engine stores an alert messaging ruleset that includes a computer-readable ruleset that implements the digital alerting logic described herein.

Such an intelligent and automated digital alerting system as described herein can be implemented over large-scale digital alerting systems to improve safety on the roadways. For example, the intelligent and automated system can be implemented to make real-time determinations on when to output vehicle-specific digital alerts for thousands, if not tens or hundreds of thousands, of vehicles in real time. It would be impractical if not impossible for such a large scale implementation of intelligent digital alerting to be implemented in a human mind. Thus, the techniques disclosed herein have a practical application to digital vehicle alerting systems that improves roadway safety.

In an example, the vehicles, including the alerting vehicles and the non-alerting vehicles, are equipped with a GPS receiver to generate the vehicle telemetry data (e.g., digital data including timestamp, location, and motion information) and a wireless communications transceiver (e.g., 3G, 4G, 5G transceivers) to transmit the vehicle telemetry data and/or any other digital data from the vehicle to a base station. The vehicle telemetry data can be then be sent from the base station to the safety cloud via known networking communications technologies. In an example, a timestamp includes date and time information as is known in the field. For example, a timestamp may use the format YYYY-MM-DD hh:mm:ss, where YYYY is the year, MM is the month, DD is the day, hh is the hour (on a 24 hour clock), mm is the minutes, and ss is the seconds.

In an example, telemetry data includes data that is generated at a device (e.g., an on-board vehicle sensor or computer and/or a personal computing device, such as a smartphone) and wirelessly transmitted from the vehicle to a collection device for further analysis and/or processing. In an example, devices include at least one sensor, such as a GPS receiver, that is configured to generate at least some of the telemetry data and a wireless transceiver to transmit the telemetry data. In one example, telemetry data in the form of location data is generated and transmitted at fixed intervals.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or a combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, random access memory (not shown) contained within the computer. Alternatively, the instructions may be contained in another non-transitory computer readable media such as a magnetic data storage diskette and directly or indirectly accessed by a computer system. Whether contained in the computer system or elsewhere, the instructions may be stored on a variety of non-transitory machine-readable storage media, such as a direct access storage device (DASD) storage (e.g., a conventional "hard drive" or a Redundant Array of Independent Drives (RAID) array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A computer-implemented method for alerting vehicles, the method comprising:
    receiving, at a cloud computing system, digital data that includes location information about a vehicle;
    determining, by the cloud computing system, when to output a digital alert about a roadway hazard from the cloud computing system, which is specific to the vehicle, based on a location of the roadway hazard, the location information about the vehicle, and a factor that is known by the cloud computing system and that affects the ability of the vehicle to take a precautionary action; and
    outputting, from the cloud computing system, the vehicle-specific digital alert according to the determination;
    further comprising:
    1) Receiving telemetry data at the cloud computing system that includes a location of a roadway hazard;
    2) Receiving telemetry data at the cloud computing system that includes locations and vehicle identifiers corresponding to a plurality of vehicles; and
    3) Generating, at the cloud computing system, vehicle-specific digital alerts for vehicles that are in an alerting zone of the roadway hazard in response to the location of the roadway hazard and the locations of the plurality of vehicles, wherein the alerting zone is established by the cloud computing system in response to receiving the telemetry data that includes the location of the roadway hazard.

2. The computer-implemented method of claim 1, wherein the factor that affects the ability of the vehicle to take a precautionary action is obtained from the digital data that includes location information about the vehicle, which was received at the cloud computing system.

3. The computer-implemented method of claim 1, wherein the factor that affects the ability of the vehicle to take a precautionary action is obtained in response to the location information about the vehicle and from weather information obtained from another source.

4. The computer-implemented method of claim 1, wherein the factor that affects the ability of the vehicle to take a precautionary action is obtained in response to the location information about the vehicle and from digital data obtained from another source.

5. The computer-implemented method of claim 1, wherein the factor that affects the ability of the vehicle to take a precautionary action is obtained in response to the location information about the vehicle and in response to weather conditions obtained from a third party source.

6. The computer-implemented method of claim 1, wherein the factor that affects the ability of the vehicle to take a precautionary action is a current weight of the vehicle and wherein the vehicle-specific digital alert is output to account for the current weight of the vehicle.

7. The computer-implemented method of claim 1, wherein the factor that affects the ability of the vehicle to take a precautionary action is a current weight of the vehicle that is included in the digital data and wherein the vehicle-specific digital alert is output to account for the current weight of the vehicle.

8. The computer-implemented method of claim 1, wherein:
    the digital data includes an indication that the vehicle's windshield wipers are on;
    the factor that affects the ability of the vehicle to take a precautionary action is the indication that the vehicle's windshield wipers are on; and
    the vehicle-specific digital alert is output to account for the vehicle's wipers being on.

9. The computer-implemented method of claim 1, wherein:
    the digital data includes an indication that the vehicle's lights are on;
    the factor that affects the ability of the vehicle to take a precautionary action is the indication that the vehicles headlights are on; and
    the vehicle-specific digital alert is output to account for the vehicle's lights being on.

10. The computer-implemented method of claim 1, wherein the factor that affects the ability of the vehicle to take a precautionary action is an indication of road friction corresponding to the vehicle and wherein the vehicle-specific digital alert is output to account for the indication of road friction.

11. The computer-implemented method of claim 1, wherein:
    the digital data includes an indication of a type of the vehicle;
    the factor that affects the ability of the vehicle to take a precautionary action is the type of the vehicle; and
    the vehicle-specific digital alert is output to account for the type of the vehicle.

12. The computer-implemented method of claim 1, wherein:
    the digital data includes an indication that the vehicle is a truck;
    the factor that affects the ability of the vehicle to take a precautionary action is that the vehicle is a truck; and
    the vehicle-specific digital alert is output to account for the vehicle being a truck.

13. The computer-implemented method of claim 1, wherein the factor is visibility that is determined in response to the location of the vehicle and a timestamp associated with the digital data.

14. The computer-implemented method of claim 1, wherein the factor is a weather condition that is determined in response to the location of the vehicle.

15. The computer-implemented method of claim 1, wherein determining when to output the vehicle-specific digital alert from the cloud computing system involves adjusting a baseline separation distance.

16. The computer-implemented method of claim 1, wherein determining when to output the vehicle-specific digital alert from the cloud computing system involves adjusting a baseline separation distance by a safety margin.

17. The computer-implemented method of claim 1, wherein modifying the digital alerting rule includes changing a characteristic of how a digital alert is presented within a vehicle.

18. A non-transitory computer readable medium comprising instructions to be executed in a computer system, wherein the instructions when executed in the computer system perform a method comprising:

receiving, at a cloud computing system, digital data that includes location information about a vehicle;

determining, by the cloud computing system, when to output a digital alert about a roadway hazard from the cloud computing system, which is specific to the vehicle, based on a location of the roadway hazard, the location information about the vehicle, and a factor that is known by the cloud computing system and that affects the ability of the vehicle to take a precautionary action; and outputting, from the cloud computing system, the vehicle-specific digital alert according to the determination;

further comprising:
1) Receiving telemetry data at the cloud computing system that includes a location of a roadway hazard;
2) Receiving telemetry data at the cloud computing system that includes locations and vehicle identifiers corresponding to a plurality of vehicles; and
3) Generating, at the cloud computing system, vehicle-specific digital alerts for vehicles that are in an alerting zone of the roadway hazard in response to the location of the roadway hazard and the locations of the plurality of vehicles, wherein the alerting zone is established by the cloud computing system in response to receiving the telemetry data that includes the location of the roadway hazard.

* * * * *